(12) United States Patent
Bergeron et al.

(10) Patent No.: US 8,486,360 B2
(45) Date of Patent: Jul. 16, 2013

(54) GECL₄ AND/OR SICL₄ RECOVERY PROCESS FROM OPTICAL FIBERS OR GLASSY RESIDUES AND PROCESS FOR PRODUCING SICL₄ FROM SIO₂ RICH MATERIALS

(75) Inventors: Mario Bergeron, Quebec (CA); Alain Langlais, Quebec (CA)

(73) Assignee: Institut National de la Recherche Scientifique, Quebec (Quebec) (CA)

(*) Notice: Subject to any disclaimer, the term of this patent is extended or adjusted under 35 U.S.C. 154(b) by 432 days.

(21) Appl. No.: 12/746,267

(22) PCT Filed: Dec. 1, 2008

(86) PCT No.: PCT/CA2008/002106
§ 371 (c)(1),
(2), (4) Date: Jun. 4, 2010

(87) PCT Pub. No.: WO2009/070874
PCT Pub. Date: Jun. 11, 2009

(65) Prior Publication Data
US 2010/0272625 A1 Oct. 28, 2010

Related U.S. Application Data

(60) Provisional application No. 60/992,354, filed on Dec. 5, 2007, provisional application No. 61/042,859, filed on Apr. 7, 2008.

(51) Int. Cl.
*C01B 33/08* (2006.01)
*C01G 17/04* (2006.01)

(52) U.S. Cl.
USPC ............ 423/341; 423/292; 423/494

(58) Field of Classification Search
USPC ............ 423/277, 278, 292, 341, 494
See application file for complete search history.

(56) References Cited

U.S. PATENT DOCUMENTS 3,993,732 A * 11/1976 Filby .................. 423/286
4,083,927 A 4/1978 Wyndham
(Continued)

FOREIGN PATENT DOCUMENTS

DE 11 23 298 B 2/1962
DE 34 42 370 A1 5/1985
(Continued)

OTHER PUBLICATIONS

Ruoyu, Zhang, "Silicon Tetrachloride from Diatomite", YunNan Chemical Industry, Dec. 31, 1994, No. 4. pp. 44-46.
(Continued)

*Primary Examiner* — Ngoc-Yen Nguyen
(74) *Attorney, Agent, or Firm* — Sutherland Asbill & Brennan LLP

(57) ABSTRACT

A method is provided for producing $GeCl_4$ with or without $SiCl_4$ from optical fibers, the method comprises the steps of: reacting comminuted optical fibers including germanium and optionally silicon oxides with a reagent including a solid carbonaceous reducing agent, chlorine and a boron compound to obtain a gaseous product including gaseous $GeCl_4$, gaseous $SiCl_4$, and gaseous $BCl_3$ in accordance with the reactions: $2BCl_3(g)+1.5GeO_2=1.5GeCl_4(g)+B_2O_3$; $2BCl_3(g)+1.5SiO_2=1.5SiCl_4(g)+B_2O_3$; $B_2O_3+1.5C+3Cl_2=2BCl_3(g)+1.5CO_2$; and then condensing the gaseous $GeCl_4$, $BCl_3$ and optionally $SiCl_4$ into liquid $GeCl_4$, $BCl_3$ and optionally $SiCl_4$. The invention further provides a method for producing $SiCl_4$ (and optionally $GeCl_4$) from glassy residues obtained from optical fiber manufacturing and wasted optical cables. The method includes the steps of: reacting comminuted glassy residues with a reagent including a solid carbonaceous reducing agent, a salt, a boron compound to obtain a gaseous product including $SiCl_4$, $BCl_3$, and optionally $GeCl_4$; and then condensing the gaseous $SiCl4$, $BCl_3$ (with or without $GeCl_4$) into liquid $SiCl_4$, $BCl_3$ and $GeCl_4$. There is also provided a method for producing $SiCl_4$ from a $SiO_2$ containing material.

17 Claims, 8 Drawing Sheets

U.S. PATENT DOCUMENTS

| | | | |
|---|---|---|---|
| 4,125,590 A * | 11/1978 | Schmoyer | 423/292 |
| 4,220,629 A | 9/1980 | Wyndham et al. | |
| 4,490,344 A | 12/1984 | Iwai et al. | |
| 4,604,272 A | 8/1986 | Kratel et al. | |
| 4,847,059 A | 7/1989 | Nakata et al. | |

FOREIGN PATENT DOCUMENTS

| | | |
|---|---|---|
| JP | 2004243264 | 9/2004 |
| JP | 2005104128 | 4/2005 |
| JP | 2006182863 | 7/2006 |
| JP | 2006187764 | 7/2006 |
| KR | 20050077446 | 8/2005 |

OTHER PUBLICATIONS

Williams, "Global Production Chains and Sustainability," Jul. 2000, The case of high purity silicon and its application in IT and renewable energy, UNU/IAS, 1-145 pages.

Ogura, et al., "Development of a Technology for Silicon Production by Recycling Wasted Optical Fiber," 2004, Ind. Eng. Chem. Res., 43, 1890-1893.

Tandon, "Fundamental Understanding of Processes Involved in Optical Fiber Manufacturing Using Vapor Deposition Method," 2005, Int. J. Appl. Ceram. Technol., 2, 6, 504-513.

Bohrer, et al., "A Process for Recovering Germanium from Effluents of Optical Fiber Manufacturing," Jun. 1985, Journal of Light Wave Technology, vol. LT-3, 3, 699-705.

Höll, et al., "Metallogenesis of Germanium—A Review.," Ore Geology Reviews 30 2007, 145-180.

Ma, et al., "Preparation of Solar Grade Silicon from Optical Fibers Wastes with Thermal Plasmas," Solar Energy Materials and Solar Cells, 2004, 81, 477-483.

NTT Communications Group, Environmental protection activity annual report, 2004.

Kroll, "Chlorine Metallurgy-Part 1,"Metal Industry, Sep. 1952, 81, (13), 243-6.

Alam, et al., "Kirk-Othmer Encyclopedia of Chemical Technology," 2004 138-168.

Barin, et al., "On the Kinetics of the Chlorination of Titanium Dioxide in the Presence of Solid Carbon," Jun. 1980, Metallurgical Transactions B, vol. 11B, pp. 199-207.

Muetterties, "Alkali Metal Tetrachloroborates," Journal of the American Chemical Society, Oct. 1957, vol. 79, 6563-6564.

Korshunov, "Applications and Potential uses of Chlorination Methods in Metallurgy of Non-Common Metals," 1992, Metallurgical Review of MMIJ, vol. 8, (2), pp. 1-33.

Bandosz, et al., "Surface Chemistry of Activated Carbons and its Characterization," Activated Carbon Surfaces in Environmental Remediation, Elsevier 2006, p. 159-229.

Savel'ev, et al., Neorganicheskie Materialy, 1973, 9, (2), 325-6 (Abstract).

Kroll W.J. Chlorine Metallurgy—Part I, Metal Industry, Sep. 26, 1952, pp. 243-245 and 252.

International Search Report of PCT/CA2008/002106.

European Search Report of Application No. 08857957.8 dated Jul. 12, 2012.

* cited by examiner

GECL₄ AND/OR SICL₄ RECOVERY PROCESS FROM OPTICAL FIBERS OR GLASSY RESIDUES AND PROCESS FOR PRODUCING SICL₄ FROM SIO₂ RICH MATERIALS

CROSS-REFERENCE TO RELATED APPLICATIONS

This application claims benefit of U.S. Provisional Application No. 60/992,354 filed Dec. 5, 2007 and to U.S. Provisional Application No. 61/042,859 filed Apr. 7, 2008, which are incorporated by reference herein. This application is the national stage of International Application No. PCT/CA2008/002106 filed Dec. 1, 2008, which is incorporated by reference herein.

FIELD OF THE INVENTION

The invention relates to a process for recovering germanium and silicon from optical fibers and, more particularly, it relates to a process for recovering germanium and silicon chlorides from optical fibers containing germanium and silicon oxides. The invention relates to a process for producing $SiCl_4$ from silicon oxides such as $SiO_2$ and to a process for concurrently producing $SiCl_4$ and $GeCl_4$ from glassy residues such as optical fibers.

DESCRIPTION OF THE PRIOR ART

Processes for manufacturing optical cables including optical fibers, as active components for light signal transmission, are typically separated in three major steps: a) preform manufacturing, b) optical fiber drawing, and c) optical fiber cabling (Williams, 2000, The case of high purity silicon and its application in IT and renewable energy, UNU/IAS, 145 p.). Optical fibers have a core presenting a high refractive index surrounded by a cladding showing a lower refractive index (Alwayn, 2004, Optical network design and implementation, Cisco Press, 840 p.). Often, the core is made of fused silica containing germanium oxide, used as a doping agent, to increase the refractive index of silica. The cladding is habitually made of pure silica.

The manufacturing of optical fibers is based on dechlorination reactions were chlorides are transformed into oxides in a chemical reactor heated at around 1000° C. The oxides are deposited on a solid support made of silica. Three main deposition systems exist (Williams, 2000). First, in a modified chemical vapor deposition (MCVD) process, the oxides are deposited inside a high purity silica tube, the dechlorination reactions are conducted until the tube is filled. The resulting glass rod is sintered into a preform and the obtained preform is ready for the drawing step. Second, an outside deposition system (ODS) uses a glass rod as a support where the oxide particles built up, the dechlorination reactions are conducted until the desired rod diameter is reached. The rod is then sintered into a preform. Finally, the axial vapor deposition (AVD) process is somewhat similar to the ODS system, except that the building up of the oxide material is conducted from a point as opposed to the entire rod length. The resulting soot is sintered into a preform.

The dechlorination reactions which occur in the MCVD process for manufacturing optical fibers made of $SiO_2$ and $GeO_2$ are (Tandon, 2005, Int. J. Appl. Ceram. Technol., 2, 6, 504-513):

$$SiCl_4(g)+2O_2(g)=SiO_2(s)+2Cl_2(g) \quad (1)$$

$$GeCl_4(g)+2O_2(g)=GeO_2(s)+2Cl_2(g) \quad (2)$$

For the ODS and AVD processes, the dechlorination reactions are (Williams, 2000):

$$SiCl_4(g)+O_2(g)+2H_2=SiO_2(s)+4HCl(g) \quad (3)$$

$$GeCl_4(g)+O_2(g)+2H_2=GeO_2+4HCl(g) \quad (4)$$

$SiCl_4$ and $GeCl_4$ are the starting chemical components for these three processes.

By carefully choosing the adequate reagent mixture, preforms consisting of a core enriched in a given high refractive index oxide, surrounded by a cladding of pure silica are obtained from these processes. The preforms are placed on a vertical shaft. A small furnace melts the basal tip of the blank preform. The melted material is pulled as an optical fiber which is coated and rolled up onto a spool (Yin and Jaluria, 1998, Trans. ASME, 120, 916-930).

The industry of optical fibers used extremely pure starting chlorides quoted as optical grade specification (99.999999 wt %, 6 decimal nines) in order to produce optical fibers made of pure oxides. Such purity is necessary to assure no distortion of the optical signals transmitted (Alwayn, 2004). Because of the purity required, the chlorides used in the dechlorination reactions are very expensive. This is specifically true for germanium tetrachloride, germanium being a scarce element in the earth crust (Höll, R, Kling, M, Schroll, E: Metallogenesis of germanium—a review. Ore Geology Reviews 30 (2007), 145-180).

Manufacturing optical fibers produce important losses. An amount of high purity glasses substantially equal to the amount of optical fiber produced is defective or lost during the fabrication (Ma, Ogura, Kobayashi and Takahashi, Solar Energy Materials and Solar Cells, 2004, 81, 477-483).

The optical fibers, often called the glassy components, contained in end-of-life cables are presently considered as a zero value component. When optical cable recycling is performed, the glassy components are disposed in cement production furnaces or as raw material for civil engineering work (NTT Group, Environmental protection activity annual report, 2004).

An efficient process is thus needed in order to recycle defective optical fibers, losses of high purity glasses occurring during manufacturing of optical fibers, and optical fibers presents in end-of-life optical cables.

Japanese publication No. 2003-37904 by Takahashi reports the use of a novel thermal plasma system by which high purity $SiO_2$ from optical fiber residues are converted to solar grade silicon (SOG-Si) used for the production of solar panels.

South Korean publication No. 2004-5357 by Jin, Kang and Lee instructs on the recovery of non deposited $SiO_2$ during the preform filling. The non deposited glassy particles are recovered on a glass particles collector. These particles are manufactured into a new preform using a special injection equipment.

Other patents listed below concern methods for dismantling optical cables into their basic components and therefore they are not related to the recovery of high-purity components from optical fibers.

Japanese publication No. 2004-38788 by Nakane teaches on the recycling of plastics and rubbers from wasted optical cables for the recovery of high-purity polyethylene and aluminum.

Japanese publication No. 2004-376291 by Ito, Usami and Masura, relates to the separation of organic clad from optical fiber residues obtained by segregation of optical cables. The process involves solvent extraction and screening to obtain a clean quartz-glass material recycled as cement component and coated resins recycled as a solid fuel.

Japanese publication No. 2005-339701 by Ito, Usami and Masura, reports on the recycling of optical cables by crushing and sieving into usable materials.

These three previous documents demonstrate that technologies are available to isolate the glassy components from optical cables. All of those approaches are based on low cost technologies such as crushing, sieving, and solvent extraction in order to isolate the glassy components from the other optical cable components.

Two publications, concerning the recycling of glassy residues, originating from the production of optical fibers or from end-of-life optical cables, as high-purity products, have been located. These two publications are derived from the Japanese Publication No. 2003-37904 by Takahashi on the recycling of high-purity glassy materials by a thermal plasma system. The first one by Ma, et al., (2004) presents the previously described technology. The second one by Ogura, Astuti, Yoshikawa, Morita and Takahashi (2004, Ind. Eng. Chem. Res., 43, 1890-1893) describes a process using an arc-plasma furnace by which a mixture of silicon carbide and silicon is obtained from a feed of wasted optical fibers. When the silicon carbide product is recycled in the process furnace, the yield of high-purity silicon production increased. This process is run at very high temperature and produce silicon as a feedstock for the fabrication of solar panels.

In addition, Bohrer, Amelse, Narasimham, Tariyal, Turnipseed, Gill, Moebuis and Bodeker (1985, Journal of Light Wave Technology, LT-3, 3, 699-705) have developed a process for the recovery of the unused $GeCl_4$ in reactions (2) and (4) exiting the deposition system and present in the process effluents. $GeCl_4$ is trapped into the gas scrubber as soluble germanate ions. After, a certain recirculation time to build up the concentration, the germanate ions react with magnesium sulfate to precipitate magnesium germanate which is filtered, dried, bagged and sold to a manufacturer.

U.S. Pat. No. 4,490,344 discloses $BCl_3$ as a chlorination agent for the formation of $SiCl_4$ from $SiO_2$.

BRIEF SUMMARY OF THE INVENTION

It is therefore an aim of the present invention to address the above mentioned issues.

According to a general aspect, there is provided a method for producing $GeCl_4$ from $GeO_2$-containing material, the method comprising the steps of:

reacting comminuted residues of material containing germanium oxide with a reagent including a solid carbonaceous reducing agent, chlorine and a boron compound to obtain a gaseous product including gaseous $GeCl_4$ and gaseous $BCl_3$ in accordance with the reactions:

$$2BCl_3(g)+1.5GeO_2=1.5GeCl_4(g)+B_2O_3$$

$$B_2O_3+1.5C+3Cl_2=2BCl_3(g)+1.5CO_2; \text{ and}$$

condensing the gaseous $GeCl_4$ and $BCl_3$ into liquid $GeCl_4$, and $BCl_3$ by lowering gaseous product temperature below $GeCl_4$ and $BCl_3$ condensing temperatures.

In an embodiment, the method further comprises separating the mixture of liquid $GeCl_4$ and liquid $BCl_3$ by fractional distillation to obtain high purity liquid $GeCl_4$ and high purity liquid $BCl_3$.

In an embodiment, the $GeO_2$-containing material further contains silicon oxide and the method comprises the steps of:

reacting comminuted residues of a material including germanium oxide and silicon oxide with a reagent including a solid carbonaceous reducing agent, chlorine and a boron compound to obtain a gaseous product including gaseous $GeCl_4$, gaseous $SiCl_4$ and gaseous $BCl_3$ in accordance with the reactions:

$$2BCl_3(g)+1.5GeO_2=1.5GeCl_4(g)+B_2O_3$$

$$2BCl_3(g)+1.5SiO_2=1.5SiCl_4(g)+B_2O_3$$

$$B_2O_3+1.5C+3Cl_2=2BCl_3(g)+1.5CO_2; \text{ and}$$

condensing the gaseous $GeCl_4$, $SiCl_4$ and $BCl_3$ into liquid $GeCl_4$, $SiCl_4$ and $BCl_3$ by lowering gaseous product temperature below $GeCl_4$, $SiCl_4$ and $BCl_3$ condensing temperatures.

The resulting $GeCl_4$ and/or $SiCl_4$ can be used for the production of starting components for optical fiber manufacturing.

According to a general aspect, there is provided a method for producing $SiCl_4$ from $SiO_2$-containing material, the method comprising the steps of: reacting comminuted $SiO_2$-containing material with a reagent including a solid carbonaceous reducing agent, a salt selected from the group consisting of: KCl, CsCl and RbCl, a boron compound, and optionally chlorine ($Cl_2$) to obtain a gaseous product including gaseous $SiCl_4$ in accordance with the reactions:

$$4BCl_4^-(l)+SiO_2+C=SiCl_4(g)+4BCl_3(g)+CO_2$$

condensing the gaseous $SiCl_4$ into liquid $SiCl_4$ by lowering gaseous product temperature below $SiCl_4$ condensing temperature.

In an embodiment, the $SiO_2$-containing material is glassy residues.

The $SiO_2$-containing material can further contain $GeO_2$ and the reaction also produces $GeCl_4$ according to the reaction:

$$4BCl_4^-(l)+GeO_2+C=GeCl_4(g)+4BCl_3(g)+CO_2$$

further comprising condensing the gaseous $SiCl_4$ and $GeCl_4$ into liquid $SiCl_4$ and $GeCl_4$ by lowering gaseous product temperature below $SiCl_4$ and $GeCl_4$ condensing temperatures.

In an embodiment, $BCl_3$ is condensed along with condensing $SiCl_4$ by lowering gaseous product temperature below $SiCl_4$ and $BCl_3$ condensing temperatures.

The produced $GeCl_4$ and $SiCl_4$ can be used as starting components for optical fiber manufacturing.

In an embodiment, the chlorine ($Cl_2$) is absent.

According to another general aspect, there is provided a method for producing $SiCl_4$ from $SiO_2$-containing material, the method comprising the steps of: reacting a comminuted $SiO_2$ containing material with a reagent including a solid carbonaceous reducing agent, a salt selected from the group consisting of KCl, RbCl, and CsCl, chlorine and a boron compound to obtain a gaseous product including gaseous $SiCl_4$; and condensing the gaseous $SiCl_4$ into liquid $SiCl_4$ by lowering gaseous product temperature below $SiCl_4$ condensing temperature and above $BCl_3$ condensing temperature.

The method can further comprise condensing chloride impurities by lowering gaseous product temperature above $SiCl_4$ condensing temperature prior to carrying the $SiCl_4$ condensing step.

The solid carbonaceous reducing agent can be one of metallurgical coke and activated carbon. The boron compound can comprise gaseous $BCl_3$. The reacting step can be carried out at a temperature ranging between 450° C. and 1100° C. into a corrosion-resistant reactor.

According to a general aspect, there is provided a method for producing $GeCl_4$ from optical fibers; the method comprising the steps of: reacting comminuted optical fibers including germanium oxides with a reagent including a solid carbonaceous reducing agent, chlorine and a boron compound to obtain a gaseous product including gaseous $GeCl_4$, and gaseous $BCl_3$ in accordance with the reactions:

$$2BCl_3(g)+1.5GeO_2=1.5GeCl_4(g)+B_2O_3 \tag{5}$$

$$B_2O_3+1.5C+3Cl_2=2BCl_3(g)+1.5CO_2; \text{ and} \tag{7}$$

condensing the gaseous $GeCl_4$ and $BCl_3$ into liquid $GeCl_4$ and $BCl_3$.

According to another general aspect, there is provided a method for producing $GeCl_4$ as starting components for optical fiber manufacturing. The method comprises the steps of: reacting comminuted optical fiber glassy residues including germanium and silicon oxides with a reagent including a solid carbonaceous reducing agent, chlorine and a boron compound to obtain a gaseous product including gaseous $GeCl_4$, and gaseous $BCl_3$; condensing the gaseous $GeCl_4$ and $BCl_3$ into liquid $GeCl_4$ and $BCl_3$.

According to a further general aspect, there is provided a method for chlorinating $GeO_2$ encapsulated into glasses. The method comprises the steps of: reacting comminuted glasses with a reagent including a solid carbonaceous reducing agent, chlorine and a boron compound to obtain a gaseous product including gaseous $GeCl_4$, and gaseous $BCl_3$; and condensing the gaseous $GeCl_4$ and $BCl_3$ into liquid $GeCl_4$ and $BCl_3$.

The glasses can be $SiO_2$ glasses and the gaseous product comprises gaseous $SiCl_4$. In an embodiment, the condensing step is performed by lowering gaseous product temperature below $GeCl_4$, $SiCl_4$, if any, and $BCl_3$ condensing temperatures to obtain liquid $GeCl_4$, $SiCl_4$, if any, and $BCl_3$.

According to still another general aspect, there is provided a method for producing $GeCl_4$ from optical fibers. The method comprising the steps of: reacting optical fibers including germanium oxides with a reagent including a reducing agent and $BCl_3$ to obtain a gaseous product including gaseous $GeCl_4$, and gaseous $BCl_3$; and condensing the gaseous $GeCl_4$ and $BCl_3$ into liquid $GeCl_4$ and $BCl_3$.

According to another aspect, there is provided the methods for producing $GeCl_4$ from optical fibers, optical fibers glassy residues or any other $GeO_2$ containing residues as defined above, wherein the residues also contain $SiO_2$, the method comprising the steps of: reacting residues including germanium and silicon oxides with a reagent including a solid carbonaceous reducing agent, chlorine and a boron compound to obtain a gaseous product including gaseous $GeCl_4$, gaseous $SiCl_4$, and gaseous $BCl_3$ in accordance with the reactions:

$$2BCl_3(g)+1.5GeO_2=1.5GeCl_4(g)+B_2O_3 \tag{5}$$

$$2BCl_3(g)+1.5SiO_2=1.5SiCl_4(g)+B_2O_3 \tag{6}$$

$$B_2O_3+1.5C+3Cl_2=2BCl_3(g)+1.5CO_2; \tag{7}$$

condensing the gaseous $GeCl_4$, $SiCl_4$ and $BCl_3$ into liquid $GeCl_4$, $SiCl_4$ and $BCl_3$.

According to a further aspect of the invention, the is provided the methods as defined above wherein the liquid $GeCl_4$ and/or liquid $SiCl_4$ and/or liquid $BCl_3$ are separated by fractional distillation.

According to a general aspect, there is provided a method for producing $GeCl_4$ and $SiCl_4$ from optical fibers, the method comprising the steps of: reacting comminuted optical fibers including germanium and silicon oxides with a reagent including a solid carbonaceous reducing agent, chlorine and a boron compound to obtain a gaseous product including gaseous $GeCl_4$, gaseous $SiCl_4$, and gaseous $BCl_3$ in accordance with the reactions:

$$2BCl_3(g)+1.5GeO_2=1.5GeCl_4(g)+B_2O_3 \tag{5}$$

$$2BCl_3(g)+1.5SiO_2=1.5SiCl_4(g)+B_2O_3 \tag{6}$$

$$B_2O_3+1.5C+3Cl_2=2BCl_3(g)+1.5CO_2; \tag{7}$$

firstly condensing the gaseous $GeCl_4$ into liquid $GeCl_4$ by lowering gaseous product temperature below $GeCl_4$ condensing temperature and above $SiCl_4$ condensing temperature; and secondly condensing the gaseous $SiCl_4$ into liquid $SiCl_4$ by lowering gaseous product temperature below $SiCl_4$ condensing temperature and above $BCl_3$ condensing temperature.

In an embodiment, the solid carbonaceous reducing agent is doped with the boron compound.

In an embodiment, the method further comprises
adsorbing, in an agitated tank, the boron compound on the solid carbonaceous reducing agent, from a solution including the boron compound, to obtain the solid carbonaceous reducing agent doped with the boron compound;
separating by filtration the solid carbonaceous reducing agent doped with the adsorbed boron compound from the solution; and
drying the solid carbonaceous reducing agent doped with the adsorbed boron compound before carrying the reacting step.

The boron compound can be $H_3BO_3$. The solution can be saturated with the boron compound. The drying step can be carried out at a temperature ranging between 450 and 550° C.

The solid carbonaceous reducing agent can be one of metallurgical coke and activated carbon. The boron compound can comprise gaseous $BCl_3$.

In an embodiment, the reacting step is carried out at a temperature ranging between 450° C. and 1100° C. into a corrosion-resistant reactor.

In an embodiment, the method further comprises recycling the solid carbonaceous reducing agent following the reacting step for reuse into the reagent of the reacting step.

The gaseous products can further include $Cl_2$ and $CO_2$, the method can further comprise carrying the gaseous product containing gaseous $Cl_2$ and $CO_2$ towards at least one of a neutralization system and a recycling system. The method can further comprise neutralizing gaseous $Cl_2$ in a scrubber where gaseous $Cl_2$ is reacted with NaOH to produce NaOCl. The method can further comprise compressing gaseous $Cl_2$ in cylinders for reuse into the reagent of the reacting step.

The method can further comprise recycling liquid $BCl_3$ for reuse into the reagent of the reacting step. The recycling step can further comprise gasifying the liquid $BCl_3$.

The method can further comprise purifying at least one of liquid $GeCl_4$ to obtain high purity liquid $GeCl_4$ and liquid $SiCl_4$ to obtain high purity liquid $SiCl_4$. The purifying step can be carried out by at least one of fractional distillation.

The method can further comprise grinding the optical fibers to obtain the comminuted optical fibers having a particle size ranging between 10 and 250 μm.

The optical fibers can originate from at least one of optical fiber manufacturing residues and wasted optical fibers.

According to another general aspect, there is provided a method for producing $GeCl_4$ and $SiCl_4$ as starting components for optical fiber manufacturing. The method comprises the steps of: reacting comminuted optical fiber glassy residues including germanium and silicon oxides with a reagent including a solid carbonaceous reducing agent, chlorine and a boron compound to obtain a gaseous product including gaseous $GeCl_4$, gaseous $SiCl_4$, and gaseous $BCl_3$; firstly condensing the gaseous $GeCl_4$ into liquid $GeCl_4$ by lowering gaseous product temperature below $GeCl_4$ condensing temperature and above $SiCl_4$ condensing temperature; and secondly condensing the gaseous $SiCl_4$ into liquid $SiCl_4$ by lowering gaseous product temperature below $SiCl_4$ condensing temperature and above $BCl_3$ condensing temperature.

The method can further comprise secondly condensing the gaseous $SiCl_4$ into liquid $SiCl_4$ by lowering gaseous product temperature below $SiCl_4$ condensing temperature and above $BCl_3$ condensing temperature.

In an embodiment, the solid carbonaceous reducing agent is doped with the boron compound. In an embodiment, the solid carbonaceous reducing agent is one of metallurgical coke and activated carbon. In an embodiment, the boron compound comprises gaseous $BCl_3$. In an embodiment, the reacting step is carried out at a temperature ranging between 450° C. and 1100° C. into a corrosion-resistant reactor.

According to a further general aspect, there is provided a method for chlorinating $GeO_2$ encapsulated into $SiO_2$ glasses. The method comprises the steps of: reacting comminuted $SiO_2$ glasses with a reagent including a solid carbonaceous reducing agent, chlorine and a boron compound to obtain a gaseous product including gaseous $GeCl_4$, gaseous $SiCl_4$, and gaseous $BCl_3$; and condensing the gaseous $GeCl_4$ into liquid $GeCl_4$ by lowering gaseous product temperature below $GeCl_4$ condensing temperature and above $SiCl_4$ condensing temperature.

According to still another general aspect, there is provided a method for producing $GeCl_4$ and $SiCl_4$ from optical fibers. The method comprising the steps of: reacting optical fibers including germanium and silicon oxides with a reagent including a reducing agent and $BCl_3$ to obtain a gaseous product including gaseous $GeCl_4$, gaseous $SiCl_4$, and gaseous $BCl_3$; and condensing the gaseous $GeCl_4$ into liquid $GeCl_4$ by lowering the gaseous product temperature below $GeCl_4$ condensing temperature and above $SiCl_4$ condensing temperature.

According to a further general aspect, there is provided a method for producing $SiCl_4$ from optical fiber glassy residues, the method comprising the steps of: reacting comminuted optical fiber glassy residues with a reagent including a solid carbonaceous reducing agent, a salt selected from the group consisting of: KCl, CsCl, and RbCl, and a boron compound to obtain a gaseous product including gaseous $SiCl_4$ in accordance with the reactions:

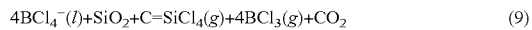

$$4BCl_4^-(l)+SiO_2+C=SiCl_4(g)+4BCl_3(g)+CO_2 \quad (9)$$

and condensing the gaseous $SiCl_4$ and $BCl_3$ into liquid $SiCl_4$ and $BCl_3$. Optionally, chlorine gas can be added as reagent.

Still, according to a further general aspect, there is provided a method for producing $SiCl_4$, and optionally $GeCl_4$ from optical fiber glassy residues, the method comprising the steps of: reacting comminuted optical fiber glassy residues with a reagent including a solid carbonaceous reducing agent, a salt selected from the group consisting of: KCl, CsCl and RbCl, a boron compound and, optionally chlorine to obtain a gaseous product including gaseous $SiCl_4$ and optionally $GeCl_4$ in accordance with the reactions:

$$4BCl_4^-(l)+GeO_2+C=GeCl_4(g)+4BCl_3(g)+CO_2 \quad (8)$$

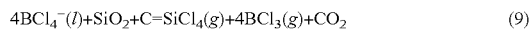

$$4BCl_4^-(l)+SiO_2+C=SiCl_4(g)+4BCl_3(g)+CO_2 \quad (9)$$

and condensing the gaseous $SiCl_4$, $GeCl_4$ if present, and $BCl_3$ into liquid $SiCl_4$, $GeCl_4$ and $BCl_3$.

According to a further general aspect, there is provided a method for producing $SiCl_4$ and $GeCl_4$ from optical fiber glassy residues, the method comprising the steps of: reacting comminuted optical fiber glassy residues with a reagent including a solid carbonaceous reducing agent, a salt selected from the group consisting of KCl, CsCl, and RbCl, chlorine and a boron compound to obtain a gaseous product including gaseous $GeCl_4$ and gaseous $SiCl_4$ in accordance with the reactions:

$$4BCl_4^-(l)+GeO_2+C=GeCl_4(g)+4BCl_3(g)+CO_2 \quad (8)$$

$$4BCl_4^-(l)+SiO_2+C=SiCl_4(g)+4BCl_3(g)+CO_2 \quad (9)$$

firstly condensing the gaseous $GeCl_4$ into liquid $GeCl_4$ by lowering gaseous product temperature below $GeCl_4$ condensing temperature and above $SiCl_4$ condensing temperature; and secondly condensing the gaseous $SiCl_4$ into liquid $SiCl_4$ by lowering gaseous product temperature below $SiCl_4$ condensing temperature and above $BCl_3$ condensing temperature.

In an embodiment, the ratio of solid carbonaceous reducing agent mass and glassy residue mass ranges between 0.3 and 1.

In an embodiment, the ratio of salt mass and the sum of glassy residue mass, solid carbonaceous reducing agent mass, and salt mass ranges between 0.03 and 0.15.

The method can further comprise drying the comminuted glassy residues at a temperature ranging between 400 and 600° C. prior to carrying the reacting step.

In an embodiment, the solid carbonaceous reducing agent is one of metallurgical coke, graphite and activated carbon. In an embodiment, the boron compound comprises gaseous $BCl_3$.

In an embodiment, the reacting step is carried out at a temperature ranging between 450° C. and 1100° C. into a corrosion-resistant reactor.

The method can further comprise recycling the solid carbonaceous reducing agent following the reacting step for reuse into the reagent of the reacting step.

The gaseous products can further include $Cl_2$ and $CO_2$ and the method can further comprise carrying the gaseous product containing gaseous $Cl_2$ and $CO_2$ towards at least one of a neutralization system and a recycling system. The method can further comprise neutralizing gaseous $Cl_2$ in a scrubber where gaseous $Cl_2$ is reacted with NaOH to produce NaOCl. The method can further comprise compressing gaseous $Cl_2$ in cylinders for reuse into the reagent of the reacting step. The method can further comprise recycling liquid $BCl_3$ for reuse into the reagent of the reacting step. The method recycling step can further comprise gasifying the liquid $BCl_3$.

The method can further comprise purifying at least one of liquid $GeCl_4$ to obtain high purity liquid $GeCl_4$ and liquid $SiCl_4$ to obtain high purity liquid $SiCl_4$.

The purifying step can be carried out by at least one of fractional distillation.

The method can further comprise grinding the glassy residues to obtain the comminuted glassy residues having a particle size ranging between 10 and 250 μm.

The optical fiber glassy residues can originate from at least one of optical fiber manufacturing residues and wasted optical fibers.

According to another general aspect, there is provided a method for producing $GeCl_4$ and $SiCl_4$ as starting components for optical fiber manufacturing. The method comprises the steps of: reacting comminuted optical fiber glassy residues with a reagent including a solid carbonaceous reducing agent, a salt selected from the group consisting of KCl, CsCl, and RbCl, chlorine and a boron compound to obtain a gaseous product including gaseous $GeCl_4$ and gaseous $SiCl_4$; firstly condensing the gaseous $GeCl_4$ into liquid $GeCl_4$ by lowering gaseous product temperature below $GeCl_4$ condensing temperature and above $SiCl_4$ condensing temperature; and secondly condensing the gaseous $SiCl_4$ into liquid $SiCl_4$ by lowering gaseous product temperature below $SiCl_4$ condensing temperature and above $BCl_3$ condensing temperature.

According to a further general aspect, there is provided a method for producing $SiCl_4$ from a $SiO_2$ containing material. The method comprises the steps of: reacting a comminuted $SiO_2$ containing material with a reagent including a solid carbonaceous reducing agent, a salt selected from the group consisting of KCl, CsCl, and RbCl, chlorine and a boron compound to obtain a gaseous product including gaseous $SiCl_4$; and condensing the gaseous $SiCl_4$ into liquid $SiCl_4$ by lowering gaseous product temperature below $SiCl_4$ condensing temperature and above $BCl_3$ condensing temperature.

According to still another general aspect, there is provided a method for producing $SiCl_4$ from glassy residues. The method comprising the steps of: reacting glassy residues with a solid carbonaceous reducing agent, a salt selected from the group consisting of KCl, CsCl, and RbCl, chlorine and a boron compound to obtain a gaseous product including gaseous $SiCl_4$; and condensing the gaseous $SiCl_4$ into liquid $SiCl_4$ by lowering the gaseous product temperature below $SiCl_4$ condensing temperature.

In an embodiment, the salt is KCl.

BRIEF DESCRIPTION OF THE DRAWINGS

It will be noted that throughout the appended drawings, like features are identified by like reference numerals.

DETAILED DESCRIPTION

Figure 1:
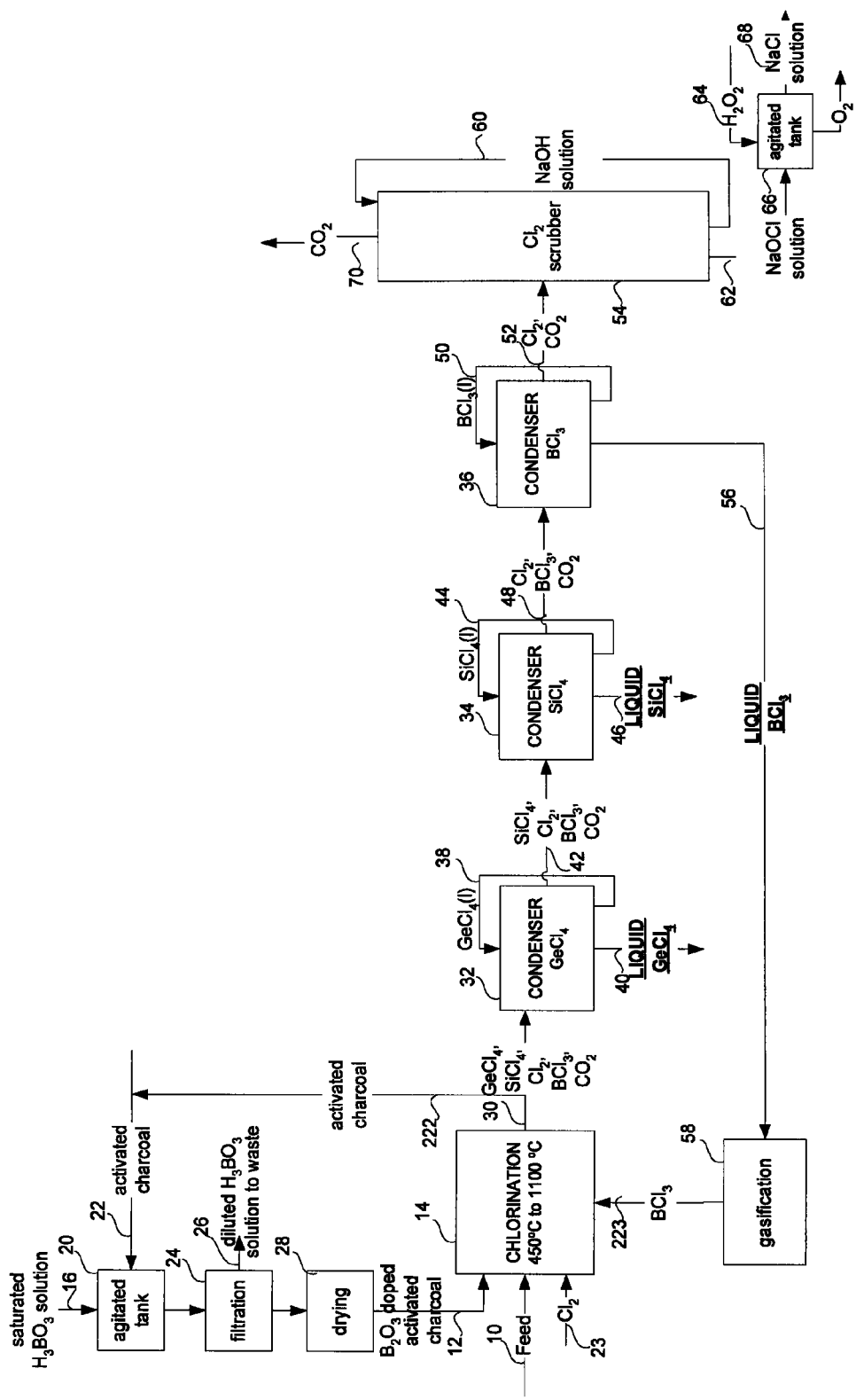
FIG. 1 is a flow diagram of the process in accordance with an embodiment, with a reagent including $B_2O_3$ doped activated charcoal.
Figure 2:
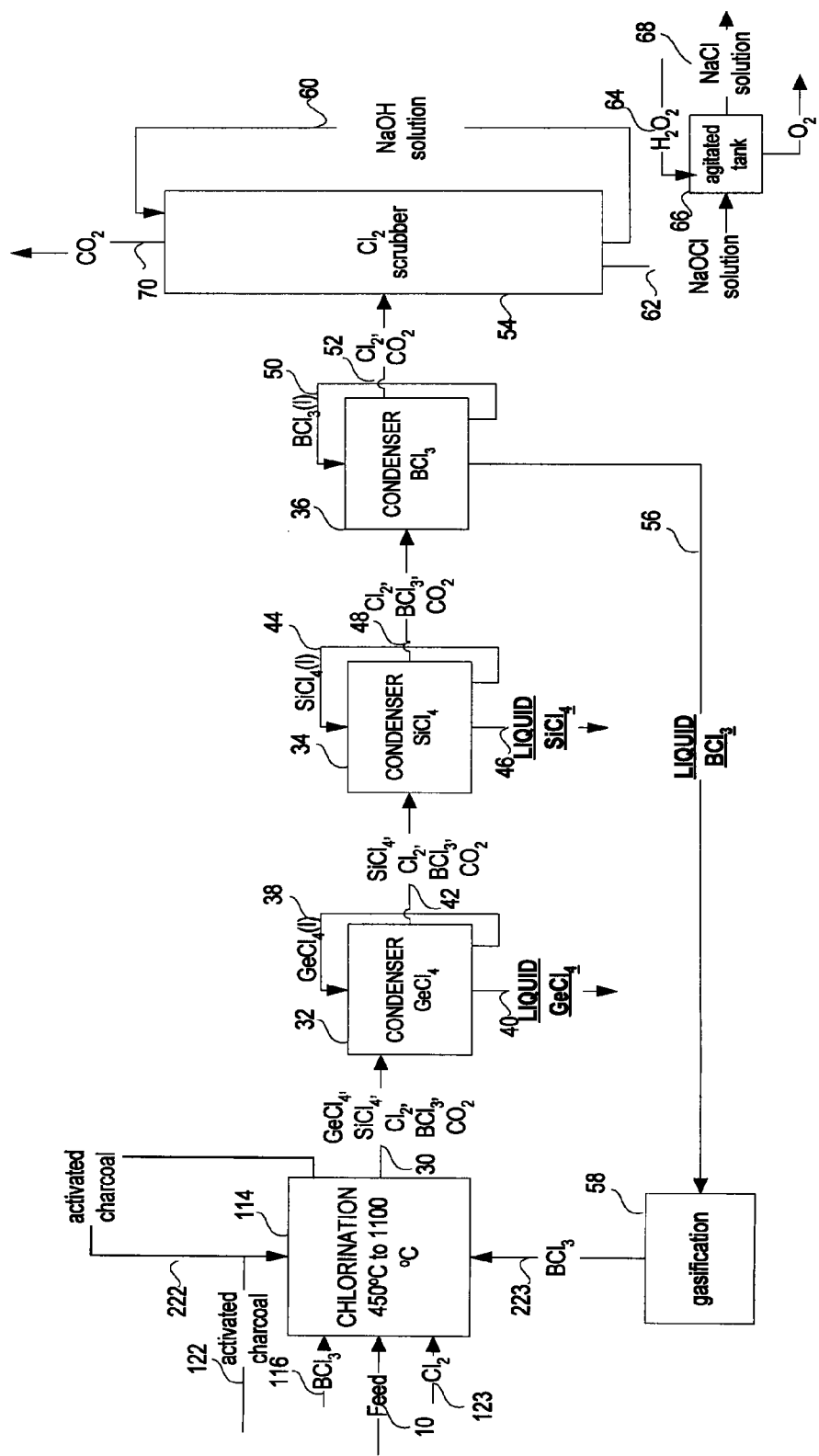
FIG. 2 is a flow diagram of the process in accordance with another embodiment, with a reagent including gaseous $BCl_3$.

Referring to the drawings and, more particularly, referring to FIGS. 1 and 2, processes for producing concurrently germanium tetrachloride and silicon tetrachloride from optical fibers are described. In the processes, germanium and silicon oxides ($GeO_2$ and $SiO_2$) present in optical fibers are converted into germanium and silicon chlorides ($GeCl_4$ and $SiCl_4$). The produced chlorides are identical to those commonly employed in the manufacture of optical fibers.

For instance, the optical fibers, as feed material 10, can be glassy residues originating from optical fiber production, i.e. glassy residues originating from optical fiber production facilities or oxides particles carry over in a scrubber unit of optic fiber production facilities, or glassy residues originating from end-of-life optical fibers, i.e. optical fibers originating from the dismantling of used optical cables.

The glassy residues, as feed material 10, are first dried and comminuted before being introduced in a chlorination reactor 14. The glassy residues can be either crushed or shredded to particles having an average size ranging between micrometers to millimeters. For instance, the particle average size can range between 10 and 250 µm. In an embodiment, the particles have a substantially uniform size.

These glassy residues can have a resin coating. This resin coating does not negatively interfere in the $GeCl_4$ and $SiCl_4$ manufacturing process. On the opposite, the resin coating can have a positive effect on the process as the organic coating can be used as a reducer during the carbochlorination process.

Chlorination and Prior Preparing Steps

As mentioned above, for manufacturing optical fibers, the dechlorination reactions (1) to (4) are carried out. To recover silicon and germanium contained in the glassy residues as oxides, these reactions are reversed.

According to another aspect of the invention, boron trichloride is used as the effective chlorination agent for $GeO_2$ and $SiO_2$. More particularly, the following reactions take place:

$$2BCl_3(g)+1.5GeO_2=1.5GeCl_4(g)+B_2O_3 \quad (5)$$

$$2BCl_3(g)+1.5SiO_2=1.5SiCl_4(g)+B_2O_3 \quad (6)$$

$$B_2O_3+1.5C+3Cl_2=2BCl_3(g)+1.5CO_2 \quad (7)$$

The action of $BCl_3$ on $SiO_2$ to produce $SiCl_4$ and $B_2O_3$ is recognized at a temperature around 350° C. (Kroll, Metal Industry, 1952, 81, (13), 243-6; Savel'ev et al., Neorganicheskie Materialy, 1973, 9, (2), 325-6). Moreover, $B_2O_3$ can be chlorinated (or regenerated) as $BCl_3$ by the action of $Cl_2$ and a reducing agent such as coke or activated charcoal (Alam et al., 2004, Kirk-Othmer Encyclopedia of chemical technology, 138-168).

To recover silicon and germanium contained in the glassy residues as oxides, $BCl_3$ is now used as effective chlorination agent in a relatively low temperature process. More particularly, $BCl_3$ is a chlorinating agent for $GeO_2$ encapsulated into $SiO_2$ glasses. Therefore, the above-mentioned reactions can be used to simultaneously produce $GeCl_4$ and $SiCl_4$ from optical fiber glassy residues containing silicium and germanium oxides.

As it will be described in more details below, $BCl_3$ can be added as a gas or can be generated in situ through reaction (7).

For carrying out the chlorination reactions, a reagent mixture including a reducing agent 22, 122, chlorine ($Cl_2$) 23, 123 and boron 16, 116 is provided in addition to the glassy residue feed material 10 (FIGS. 1 & 2).

The reducing agent can be a solid carbonaceous reducing agent such as metallurgical coke or activated carbon, for instance.

Referring to FIG. 1, there is shown that, in an embodiment, the reducing agent and boron of the reagent mixture are provided as a reducing agent doped with a boron compound 12. More particularly, a boron compound is adsorbed on a solid reducer prior to the chlorination step 14. In the embodiment shown, the solid reducer 22 is activated charcoal. As it will be described in more details below, high conversion rates for $GeO_2$ and $SiO_2$ were obtained when the reagent mixture included the reducing agent with the adsorbed boron compound.

The reducing agent with the adsorbed boron compound 12 is obtained from a solution saturated with a boron compound 16, such as $H_3BO_3$, for instance. In an agitated tank 20, the saturated solution is mixed with the solid reducing agent 22, such as activated charcoal, for instance. The solid carbonaceous reducer containing the adsorbed boron compound is separated by filtration 24, for instance, from the solution 26 and can be dried 28 at a temperature of 500° C. for three hours. In an alternate embodiment, the solid carbonaceous reducer containing the adsorbed boron compound can be dried at a temperature ranging between 450 and 550° C. for 30 minutes to three hours.

The drying step 28 can be carried out in an inert atmosphere such as with nitrogen, for instance. The drying step 28 removes any form of water which could be detrimental to the chlorination process.

The adsoption, filtration and drying steps 20, 24, 28 are usually carried outside the chlorination reactor.

Referring now to FIG. 2, there is shown that, in an alternate embodiment, the reducing agent 122, such as activated charcoal for instance, and boron 116 are distinctly provided. Instead of being adsorbed on the reducing agent 122, boron is provided separately as gaseous $BCl_3$ 116.

Now referring simultaneously to FIGS. 1 and 2, there is shown that the chlorination reaction is carried out in a chlorination reactor 14 at a temperature ranging between 450 and 1100° C. In an embodiment, the reactor 14 is made from a material resisting to the corrosive nature of gases contained therein.

In the chlorination reactor 14, a gaseous product 30 is obtained. The gaseous product 30 includes, amongst other, gaseous $GeCl_4$ and $SiCl_4$. A continuous chlorine flow ($Cl_2$) is maintained in the chlorination reactor and $GeCl_4$ and $SiCl_4$ leave the chlorination reactor 14 as vapor phases and are carried out by the gaseous product flow toward the condensation sections 32, 34, 36. The gaseous product 30 leaving the carbochlorination reactor 14 is essentially composed of $GeCl_4$, $SiCl_4$, $Cl_2$, $BCl_3$, and $CO_2$.

At the exit of the carbochlorination reactor 14, the gaseous product 30 and the solid reducer 222 are separated via a filtration system (not shown). The solid reducer 222 is collected in a receiving bin and is reused in the chlorination process as reducing agent.

The gaseous product 30 is collected in a pipe system connecting the chlorination reactor 14 to a first condensing unit 32. The pipe system is thermostated, i.e. the gas temperature inside the pipe system is controlled. Thus, the temperature can be maintained over the boiling temperature of $GeCl_4$ (84° C.), one gaseous product component. The boiling points of the other gaseous product components exiting the carbochlorination reactor 14 are lower than $GeCl_4$ boiling point. Thus, all gaseous product components remain in gaseous phase in the pipe system extending between the chlorination reactor 14 and the first condensing unit 32.

First Condensing Unit: GeCl4

The first condensing unit 32 condenses selectively $GeCl_4(g)$ from the other gaseous product components and, more particularly, $SiCl_4(g)$, $BCl_3(g)$, $Cl_2(g)$, $CO_2(g)$.

To perform this selective condensation of $GeCl_4$, the temperature inside the condenser 32 is set to a set-point slightly below $GeCl_4$ boiling point and slightly above $SiCl_4$ boiling point (57.6° C.). The gaseous product 30 is cooled and washed with liquid $GeCl_4$ 38.

The condenser 32 is filled with perforated spheres made of a resistant material. A recycling loop of liquid $GeCl_4$ connected to a shower nozzle, placed at the top of the unit, assures adequate percolation and contacts between the liquid phase 38 and the gaseous product 30. The condensed liquid $GeCl_4$ 40 is collected in a reservoir placed at the base of the condensing unit 32. The gaseous product 42 exiting the condenser 32 is essentially composed of $SiCl_4(g)$, $BCl_3(g)$, $Cl_2(g)$, and $CO_2(g)$. It is directed via a second pipe system to a second condensing unit 34 where gaseous $SiCl_4$ is condensed, as it will be described in more details below.

As for the first pipe system extending between the chlorination reactor 14 to the first condensing unit 32, the second pipe system is thermostated. Thus, the temperature can be maintained over $SiCl_4$ boiling temperature (57.6° C.) and below $GeCl_4$ boiling point (84° C.). Thus, all gaseous product components remain in gaseous phase in the second pipe system extending between the first and the second condensing units 32, 34.

Second Condensing Unit: $SiCl_4$

This second condensing unit 34 is similar to the first condensing unit 32, except that the temperature inside the condenser 34 is set to a point slightly below $SiCl_4$ condensation point and that the gaseous product 42 entering the condenser 34 is washed with $SiCl_4$ in liquid phase 44. These operating conditions allow the selective condensation of $SiCl_4$ 46 which is collected in a reservoir located at the base of the condensing equipment 34. Hence, the gaseous product 48 exiting the second condenser 34 essentially includes $BCl_3(g)$, $Cl_2(g)$, $CO_2(g)$. It is directed towards a third condensing unit 36 where the condensation of $BCl_3$ is carried out through a third pipe system.

As for the previous pipe systems, the third pipe system is thermostated and its temperature is maintained over $BCl_3$ boiling temperature (12.5° C.) and below $SiCl_4$ boiling point (57.6° C.). Thus, $BCl_3(g)$, $Cl_2(g)$, $CO_2(g)$, the gaseous product components, remain in gaseous phase in the third pipe system extending between the second and the third condensing units 34, 36.

Third Condensing Unit: $BCl_3$

In the third condensing unit 36, gaseous $BCl_3$ is condensed. The temperature inside the condenser 36 is adjusted to a set-point slightly below the condensation point of $BCl_3$ and the gas entering the condenser 36 is washed with liquid $BCl_3$ 50 allowing its selective condensation. The gaseous product 52 exiting the condenser 36 includes $Cl_2(g)$ and $CO_2(g)$ and it is directed towards a scrubbing and a neutralization systems 54.

Liquid $BCl_3$ 56 obtained at this condensation step can be recycled as a reagent 223 to the chlorination reactor 14 after a gasification step 58. The quantity of recycled $BCl_3$ 223 used to chlorinate the optical fiber feed 10 is balanced with additional input of $BCl_3$ 116 or solid boron compound 16, if necessary.

Scrubbing and Neutralization

Chlorine ($Cl_2$) is removed from the gaseous product 52 in a scrubber 54. This scrubbing unit 54 includes a vertical cylinder containing perforated plastic spheres. The scrubber 54 is filled to a certain extend with a solution of NaOH 60. A system, including a pump linked to a recycling loop and a spray nozzle located at the top of the scrubber 54, allows the gaseous product 52 to be washed and contacted with the NaOH solution 60. The following reaction occurs between chlorine contained in the gaseous product 52 and the NaOH solution 60:

$$Cl_2(g) + 2NaOH = NaOCl + NaCl + H_2O. \qquad (8)$$

The pH of the solution is controlled by an exterior supply of concentrated NaOH. The NaOCl solution 62 resulting from the scrubbing procedure is subsequently treated with $H_2O_2$ 64, in an agitated tank 66, in order to obtain a sodium chloride solution 68 by the reaction $$NaOCl+H_2O_2=NaCl+H_2O+O_2. \quad (9)$$

The gas exiting at the top of the scrubber contains essentially $CO_2$ 70. If necessary, the $CO_2$ 70 exiting the process can be trapped or neutralized by an existing complementary technology aiming at $CO_2$ emanation recovery.

$Cl_2$ Compressor

In an alternate embodiment, the chlorine scrubber unit 54 can be replaced by a chlorine compressor which allows compression of gaseous chlorine into a liquid chlorine and therefore its separation from gaseous $CO_2$. The compressed chlorine can be stored in gas cylinders for future uses such as one of the chlorination process reactant.

Liquid $GeCl_4$ and Liquid $SiCl_4$

The process described above transforms optical fibers glassy residues in chloride forms which can be directly used as feed material for manufacturing optical fibers. The liquid chlorides selectively separated during the process and collected at the base of the $GeCl_4$ condenser and the $SiCl_4$ condenser are of relatively high purity.

If necessary, additional purification steps can be performed on the separated chlorides obtained from the process. These additional purification steps can include one or several methods such as distillation, fractional distillation, solvent extraction and resin purification.

Alternative Embodiment

Figure 3:
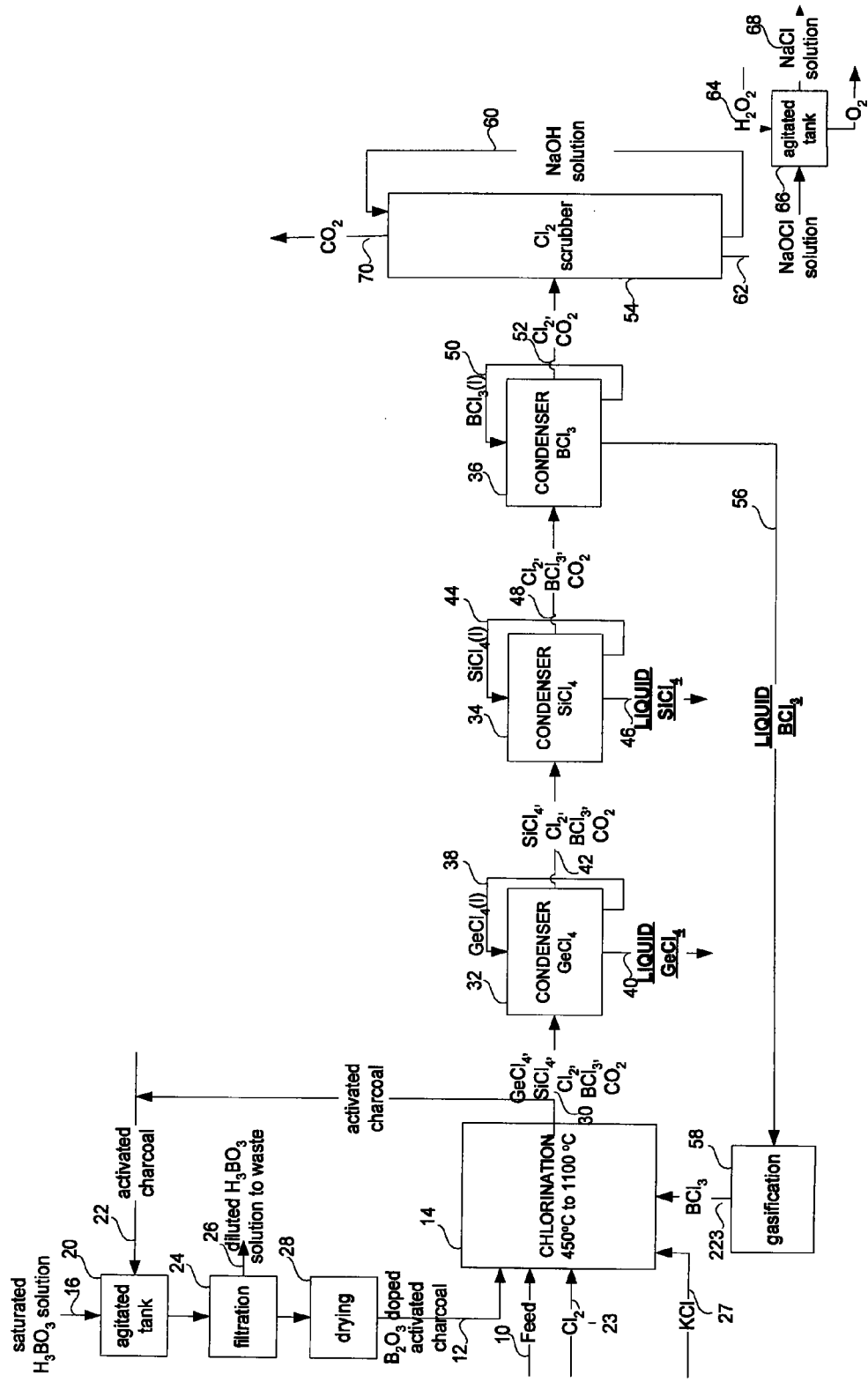
FIG. 3 is a flow diagram of a $SiO_2$ and $GeO_2$ chlorination process in accordance with an embodiment, with a reagent including $B_2O_3$ doped activated charcoal.
Figure 4:
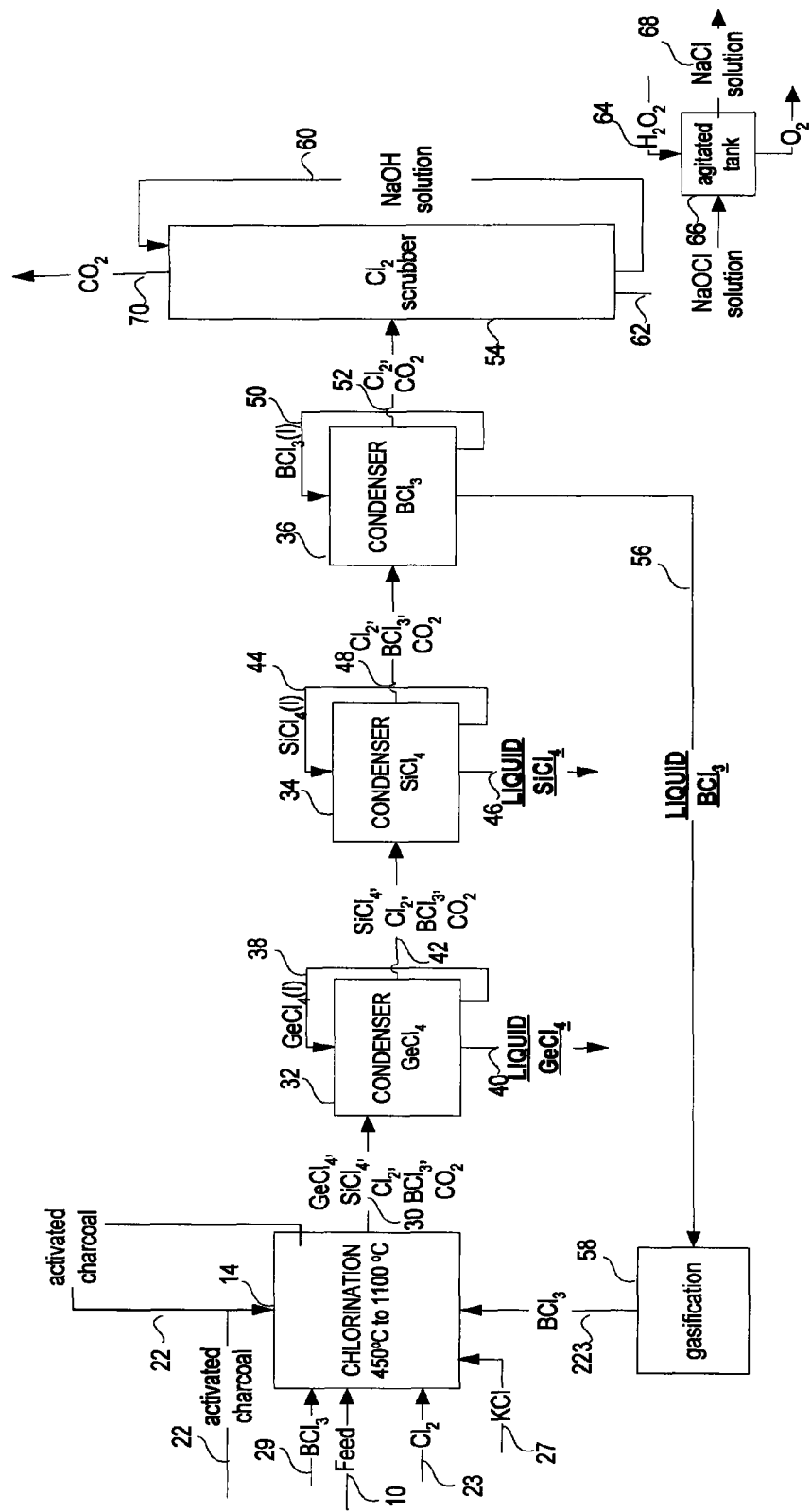
FIG. 4 is a flow diagram of the $SiO_2$ and $GeO_2$ chlorination process in accordance with another embodiment, with a reagent including activated charcoal.
Figure 5:
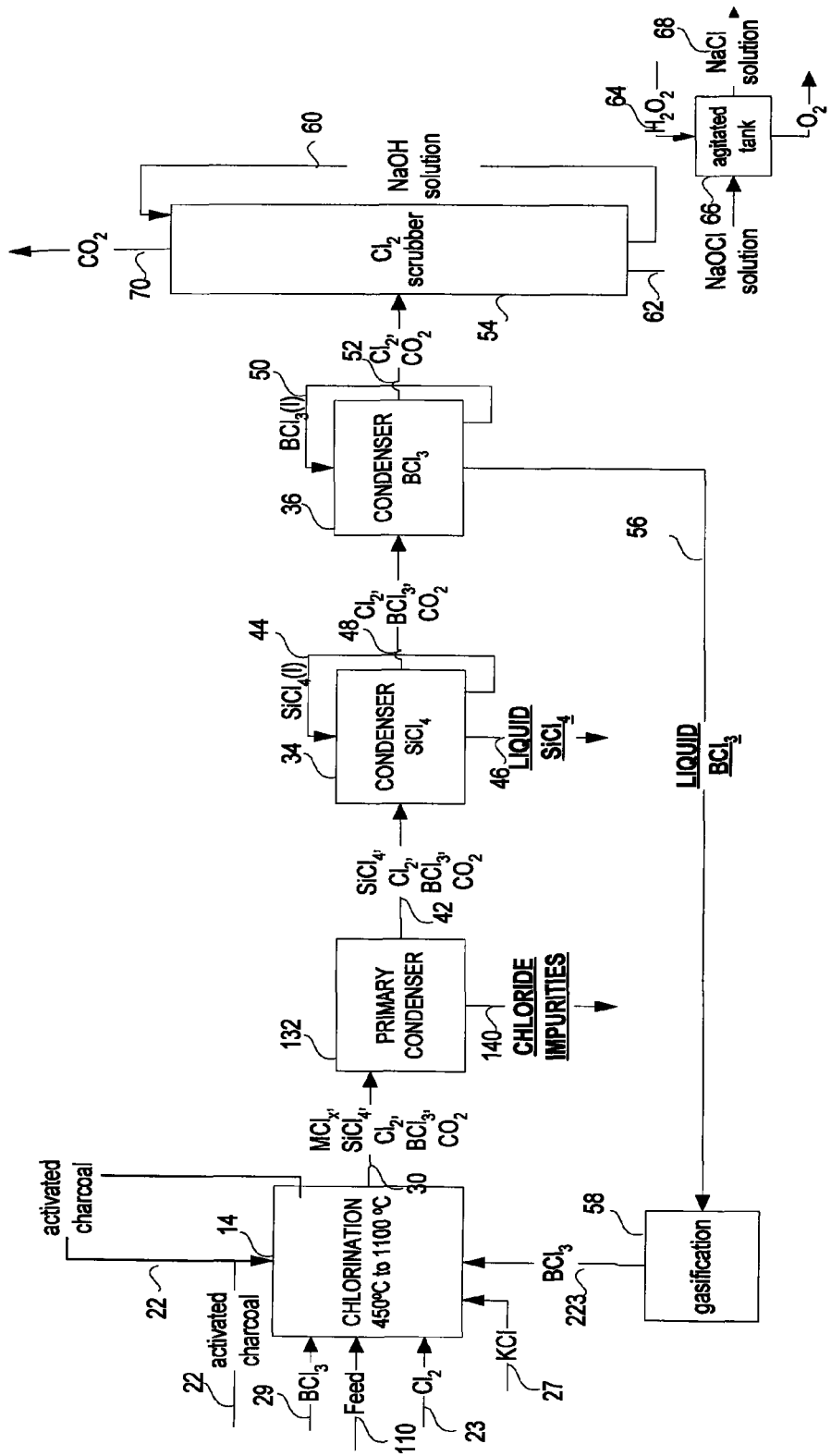
FIG. 5 is a flow diagram of the $SiO_2$ chlorination process in accordance with still another embodiment, with a $SiO_2$ rich feed material.

Referring to the drawings and, more particularly, referring to FIGS. 3 to 5, processes for producing chlorides from oxide containing feed materials are described. More particularly, in FIGS. 3 and 4, processes for producing concurrently germanium tetrachloride and silicon tetrachloride from optical fiber glassy residues are described. In the processes, germanium and silicon oxides ($GeO_2$ and $SiO_2$) present in optical fibers or other glassy residues are converted into germanium and silicon tetrachlorides ($GeCl_4$ and $SiCl_4$). The produced tetrachlorides are identical to those commonly employed in the fabrication of optical fibers. In FIG. 5, a process for producing silicon tetrachloride from a $SiO_2$-rich material is described. The silicon oxide ($SiO_2$) presents in the $SiO_2$-rich material is converted into silicon tetrachloride ($SiCl_4$).

For instance, the optical fibers, as feed material 10, can be glassy residues originating from optical fiber production, i.e. glassy residues originating from optical fiber production facilities or oxide particles carry over in a scrubber unit of optic fiber production facilities, glassy residues originating from end-of-life optical fibers, i.e. optical fibers originating from the dismantling of used optical cables, or glassy residues isolated from wasted optical cables.

These glassy residues, as feed material, can have a resin coating. This resin coating does not negatively interfere in the $GeCl_4$ and $SiCl_4$ manufacturing process. On the opposite, the resin coating can have a positive effect on the process as the organic coating can be used as a reducer during the carbochlorination process.

In an alternate embodiment, the feed material 110 (see FIG. 5) can include a $SiO_2$-rich material which is substantially free of $GeO_2$, such as quartz, and which will be converted into $SiCl_4$ in a chlorination reactor 14. In an embodiment, the $SiO_2$-rich material includes more than 90 wt % of $SiO_2$. For $SiO_2$ rich feed substantially free of $GeO_2$, the fractional distillation step is simplified since no $GeCl_4$ is present in the mixture. If necessary a primary condensing unit can be added at the exit of the reactor to remove unwanted high boiling points chloride impurities.

Prior Preparing Steps

The feed material 10, 110, either the glassy residues or the $SiO_2$-rich material, are first dried and comminuted before being introduced in a chlorination reactor 14. The feed material 110 can be either crushed, grinded, or shredded to particles having an average size ranging between micrometers to millimeters. For instance, the particle average size can range between 10 and 250 μm. In an embodiment, the particles have a substantially uniform size.

In an alternate embodiment, the grinded feed material 10, 110 is introduced in the reactor 14 without being previously dried. The drying step can be carried out within the reactor 14 or the process can be drying step free. The feed material 10, 110 can be dried at a temperature ranging between 400 and 600° C. for 0.5 hour to 3 hours, for instance. Moreover, the reagent mixture or only a portion thereof can be introduced in the reactor 14 while carrying the drying step, as it will be described in more details below. The drying step can be carried out in an inert atmosphere such as under nitrogen, for instance. The drying step removes any form of water which could be detrimental to the chlorination process.

Chlorination

As mentioned above, for manufacturing optical fibers, the dechlorination reactions (1) to (4) are carried out. To recover silicon and germanium contained in the glassy residues as oxides, these reactions are reversed in a chlorination procedure.

For carrying out the chlorination reactions, a reagent mixture including a reducing agent 12, 22, a salt 27 such as KCl, RbCl, and CsCl, chlorine ($Cl_2$) 23 and a boron compound, either $B_2O_3$ (FIG. 3) or boron trichloride ($BCl_3$) 29 (FIGS. 4 and 5), is provided in addition to the feed material 10, 110, either the glassy residues or the $SiO_2$-rich material. In FIGS. 3 to 5, the salt of the reagent mixture is KCl. The salt mass represents 3 to 15 wt % of the total solid feed mass, i.e. the feed material mass, the reducing agent mass, and the salt mass. Particularly, KCl is used. More particularly, when KCl is used, chlorine gas ($Cl_2$) may be omitted with still excellent results.

The reducing agent 12, 22 can be a solid carbonaceous reducing agent such as metallurgical coke or activated carbon/charcoal, for instance. The ratio between the reducing agent mass and the feed material mass varies between 0.3 and 1.

In an embodiment, a portion of the reagent mixture is added to the comminuted feed material 10, 110 before carrying out the drying step. For instance and without being limitative, the reducing agent 12, 22 and the salt 27, i.e. the solid components of the reagent mixture, can be added to the comminuted feed material 10, 110 before carrying out the drying step. As mentioned above, the drying step can be carried out at a temperature ranging between 400 and 600° C. for 0.5 hour to 3 hours, for instance. Once the drying step is terminated, the other components ($Cl_2$ and $BCl_3$) of the reagent mixture are added to the dried solid components.

Referring now to FIG. 3, there is shown that, in an embodiment, the reducing agent 12 is provided as a reducing agent doped with a boron compound and the feed material 10 includes glassy residues. More particularly, the boron compound is adsorbed on a solid reducer prior to the chlorination step 14. In the embodiment shown, the solid reducer 22 is activated charcoal.

The reducing agent with the adsorbed boron compound 12 is obtained from a solution saturated with a boron compound 16, such as $H_3BO_3$, for instance. In an agitated tank 20, the saturated solution is mixed with the solid reducing agent 22, such as activated charcoal, for instance. The solid carbonaceous reducer containing the adsorbed boron compound is separated by filtration 24, for instance, from the solution 26 and can be dried 28 at a temperature of 500° C. for three hours. In an alternate embodiment, the solid carbonaceous reducer containing the adsorbed boron compound can be dried at a temperature ranging between 450 and 550° C. for 30 minutes to three hours. The drying step 28 can be carried out in an inert atmosphere such as with nitrogen, for instance. The drying step 28 removes any form of water which could be detrimental to the chlorination process.

The adsorption, filtration and drying steps 20, 24, 28 are usually carried outside the chlorination reactor 14. In this embodiment, the reagent does not compulsorily include a fresh $BCl_3$ supply 29 (see FIGS. 4 and 5). However, as it will be described in more details below, recycled $BCl_3$ can be added to the reagent.

Referring now to FIG. 4, there is shown that, in an alternate embodiment, the reducing agent 22, such as activated charcoal for instance, is distinctly provided from boron. In this case, a fresh $BCl_3$ supply 29 is added to the reagent. As for the embodiment described above in reference to FIG. 3, the feed material includes glassy residues.

Referring now to FIG. 5, there is shown that, in an another alternate embodiment, the feed material 110 includes a $SiO_2$-rich material and the reducing agent 22, such as activated charcoal for instance, is distinctly provided from boron. In the embodiment shown in FIG. 5 and described below, the reagent includes a fresh $BCl_3$ supply 29. It is appreciated that, in an alternate embodiment, a reducing agent doped with a boron compound can also be used with a $SiO_2$-rich feed material.

Now referring simultaneously to FIGS. 3 to 5, there is shown that the chlorination reaction is carried out in a chlorination reactor 14 at a temperature ranging between 450 and 1100° C. and, in an alternate embodiment, the temperature is ranging between 750 and 950° C. In an embodiment, the reactor 14 is made from a material resisting to the corrosive nature of gases contained therein.

In the chlorination reactor 14, a gaseous product 30 is obtained. The gaseous product 30 includes, amongst other, gaseous $GeCl_4$ and $SiCl_4$ if the feed material 10 includes glassy residues (FIGS. 3 and 4) or gaseous $SiCl_4$ if the feed material 110 includes a $SiO_2$-rich material (FIG. 5). A continuous chlorine flow ($Cl_2$) 23 is maintained in the chlorination reactor and the gaseous product 30, including gaseous $SiCl_4$ and $GeCl_4$, if any, leaves the chlorination reactor 14 as vapor phase and is carried out toward the condensation sections 32, 34, 36, 132, as it will be described in more details below. The gaseous product 30 leaving the carbochlorination reactor 14 is essentially composed of $GeCl_4$, $SiCl_4$, $Cl_2$, $BCl_3$, and $CO_2$ if the feed material includes glassy residues (FIGS. 3 and 4) and $SiCl_4$, $Cl_2$, $BCl_3$, $CO_2$, and possibly other chloride impurities, if the feed material includes a $SiO_2$-rich material (FIG. 5).

Muetterties (Journal of the American Chemical Society, 1957, vol., 79, 6563-6564) have demonstrated that tetrachloroborate salts of the type $KBCl_4$, $RbBCl_4$ and $CsBCl_4$ can be prepared by reacting at high temperature an appropriate salt such as KCl with gaseous $BCl_3$.

In the chlorination reactions of the process, $BCl_4^-$ is used as the effective chlorinating agent for $SiO_2$ glasses and $GeO_2$ glasses contained in optical fibers and for $SiO_2$ contained in $SiO_2$-rich material. More particularly, the following reactions take place to simultaneously produce $GeCl_4$ and $SiCl_4$ from glassy residues:

$$KCl + BCl_3(g) = K^+ + BCl_4^-(l) \quad (10)$$

$$4BCl_4^-(l) + GeO_2 + C = GeCl_4(g) + 4BCl_3(g) + CO_2 \quad (11)$$

$$4BCl_4^-(l) + SiO_2 + C = SiCl_4(g) + 4BCl_3(g) + CO_2 \quad (12)$$

If the feed material is substantially free of $GeO_2$, the same reactions take place, except reaction (11).

The reactions are carried out at a temperature ranging between 450 and 1100° C., in an alternate embodiment, at a temperature ranging between 800 and 900° C., and, in still an alternate embodiment, at a temperature ranging between 825 and 875° C.

At a temperature proximate to 850° C., $KBCl_4$ is in liquid phase since this temperature is above the melting point of KCl (776° C.). The oxide and carbon particles are probably partially surrounded by a liquid bath containing $K^+$ and $BCl_4^-$ ions. The $BCl_4^-$ ion being the chlorinating agent, $Cl^-$ is transferred to the oxide surface via the reactions (11) and (12) which lead to the production of a gaseous phase including $BCl_3$, $SiCl_4$, $GeCl_4$, if any, and $CO_2$, which escapes the $KBCl_4$ liquid bath. Then, gaseous $BCl_3$ enters the reactor gaseous atmosphere in which a flow of $BCl_3$ and $Cl_2$ is maintained. $BCl_3$ is a strong Lewis acid (Alam et al., 2004, Kirk-Othmer Encyclopedia of chemical technology, 138-168) and therefore a portion of $BCl_3$ reacts with $Cl_2$ to give:

$$BCl_3(g) + Cl_2(g) = BCl_4^- + Cl^+ \quad (13)$$

The ion $BCl_4^-$ can then reenter the liquid bath by, using ion $K^+$, from reaction (10):

$$K^+ + BCl_4^- = KBCl_4 \quad (14)$$

The ion $Cl^+$ produced at reaction (13) is probably reacting with the exposed surfaces of a carbonaceous reducing agent (metallurgical coke, graphite or activated charcoal) at active sites where a high density of unpaired electrons are present (Bandosz and Ania, in: Activated carbon surfaces in environmental remediation, Elsevier 2006, p. 159-229), as illustrated by:

$$Cl^+ + C(\text{negatively charged active sites}) = C-Cl \quad (15)$$

In the reactor 14 where reactions are conducted, $GeCl_4$, if any, and $SiCl_4$ are present as gases. Since a continuous flow of $Cl_2$ 23 is maintained in the system, $GeCl_4$, if any, and $SiCl_4$ leave the reactor as vapor phases and are carried out by the gas flow toward the condensation sections of the process, which will be described in more details below. The gases leaving the carbochlorination reactor 14 include $GeCl_4$, if any, $SiCl_4$, $Cl_2$, $BCl_3$, and $CO_2$.

The gaseous product 30 and the solid reducer 22 are separated via a gas/solid separator (not shown). The solid reducer 22 is collected in a receiving bin and is reused in the chlorination process as reducing agent.

To recover silicon and germanium contained in the glassy residues as oxides, $BCl_4^-$ is used as effective chlorination agent in a relatively low temperature process. More particularly, $BCl_4^-$ is a chlorinating agent for $GeO_2$ encapsulated into $SiO_2$ glasses. Therefore, the above-mentioned reactions can be used to simultaneously produce $GeCl_4$ and $SiCl_4$ from optical fiber glassy residues containing silicium and germanium oxides. $BCl_4^-$ is also a chlorination agent for $SiO_2$ in $SiO_2$-rich feed material to produce $SiCl_4$.

As was described above and will be described in more details below, $BCl_3$ can be added as a gas (FIGS. 4 and 5) or can be generated in situ (FIG. 3) through reaction $$B_2O_3 + 1.5C + 3Cl_2 = 2BCl_3(g) + 1.5CO_2(g) \quad (7)$$

The gaseous product 30 is collected in a pipe system connecting the chlorination reactor 14 to a first condensing unit 32 (FIGS. 3 and 4) or a primary condenser 132 (FIG. 5). The pipe system is thermostated, i.e. the gas temperature inside the pipe does not allow the condensation of the gas before it reaches the condenser unit. Thus, the temperature can be maintained over the boiling/condensing temperature of $GeCl_4$ (84° C.) if the system includes a first condensing unit 32 (FIGS. 3 and 4) and above the boiling/condensing temperature of $SiCl_4$ (57.6° C.) if the system includes a primary condenser 132 (FIG. 5). For a glassy residue feed material, the boiling points of the other gaseous product components exiting the carbochlorination reactor 14 are lower than $GeCl_4$ boiling point. Thus, all gaseous product components remain in gaseous phase in the pipe system extending between the chlorination reactor 14 and the first condensing unit 32 or the primary condenser 132.

First Condensing Unit: $GeCl_4$ (FIGS. 3 and 4)

If the feed material 10 includes glassy residues and thus the gaseous product 30 includes gaseous $GeCl_4$, the first condensing unit 32 condenses selectively $GeCl_4(g)$ from the other gaseous product components and, more particularly, $SiCl_4(g)$, $BCl_3(g)$, $Cl_2(g)$, $CO_2(g)$ as shown in FIGS. 1 and 2.

To perform this selective condensation of $GeCl_4$, the temperature inside the condenser 32 is set to a set-point slightly below $GeCl_4$ boiling point and slightly above $SiCl_4$ boiling point (57.6° C.). The gaseous product 30 is cooled and washed with liquid $GeCl_4$ 38.

The condenser 32 is filled with perforated spheres made of a resistant material. A recycling loop of liquid $GeCl_4$ connected to a shower nozzle, placed at the top of the unit, assures adequate percolation and contacts between the liquid phase 38 and the gaseous product 30. The condensed liquid $GeCl_4$ 40 is collected in a reservoir placed at the base of the condensing unit 32. The gaseous product 42 exiting the condenser 32 is essentially composed of $SiCl_4(g)$, $BCl_3(g)$, $Cl_2(g)$, and $CO_2(g)$. It is directed via a second pipe system to a second condensing unit 34 where gaseous $SiCl_4$ is condensed, as it will be described in more details below.

As for the first pipe system extending between the chlorination reactor 14 to the first condensing unit 32, the second pipe system is thermostated. Thus, the temperature can be maintained over $SiCl_4$ boiling temperature (57.6° C.) and below $GeCl_4$ boiling point (84° C.). Thus, all gaseous product components remain in gaseous phase in the second pipe system extending between the first and the second condensing units 32, 34.

Primary Condenser (FIG. 5)

If the feed material 110 includes a $SiO_2$-rich material which is substantially free of $GeO_2$, the first condensing unit 32 can be replaced by a primary condenser 132 as shown in FIG. 5 since the gaseous product 30 is also substantially free of gaseous $GeCl_4$. It is appreciated that the first condensing unit 32 can be either by-passed or removed.

This primary condensing step is carried out for $SiO_2$-rich feed material containing a substantial amount of other oxides than $GeO_2$. These oxides as well as $SiO_2$ are transformed in chlorides and are transported outside the chlorination reactor 14 as gases. These chlorides ($MCl_x$) have to be condensed separately from $SiCl_4$ to avoid contamination in the subsequent process steps. Thus, the primary condenser 132 condenses chloride impurities, as a mixture, from the other gaseous product components and, more particularly, $SiCl_4(g)$, $BCl_3(g)$, $Cl_2(g)$, and $CO_2(g)$.

To perform this selective condensation, the primary condenser 132 is in fluid communication with the chlorination reactor 14 and contains large surface deflectors to collect these chloride impurities.

The temperature inside the primary condenser 132 is adjusted to be slightly above the boiling/condensing temperature of $SiCl_4$ (57.6° C.), in order to assure maximal removal of unwanted chlorides and to allow $SiCl_4$ to exit the primary condenser 132 as a gas 42.

The condensed chlorides 140 are collected in a reservoir placed at the base of the primary condenser 132. The gaseous product 42 exiting the condenser 132 is essentially composed of $SiCl_4(g)$, $BCl_3(g)$, $Cl_2(g)$, and $CO_2(g)$. It is directed via a second pipe system to a second condensing unit 34 where gaseous $SiCl_4$ is condensed, as it will be described in more details below.

As for the first pipe system extending between the chlorination reactor 14 to the primary condenser, the second pipe system is thermostated. Thus, the temperature can be maintained above $SiCl_4$ boiling temperature (57.6° C.). Thus, all gaseous product components remain in gaseous phase in the second pipe system extending between the primary condenser 132 and the second condensing unit 34.

Second Condensing Unit: $SiCl_4$

This second condensing unit 34 is similar to the first condensing unit 32, except that the temperature inside the condenser 34 is set to a point slightly below $SiCl_4$ condensation point and above $BCl_3$ condensation point and that the gaseous product 42 entering the condenser 34 is washed with $SiCl_4$ in liquid phase 44. In an embodiment, the temperature inside the condenser 34 ranges between 15 and 25° C. These operating conditions allow the selective condensation of $SiCl_4$ 46 which is collected in a reservoir located at the base of the condensing equipment 34. Hence, the gaseous product 48 exiting the second condenser 34 essentially includes $BCl_3(g)$, $Cl_2(g)$, $CO_2(g)$. It is directed towards a third condensing unit 36 where the condensation of $BCl_3$ is carried out through a third pipe system.

As for the previous pipe systems, the third pipe system is thermostated and its temperature is maintained over $BCl_3$ boiling temperature (12.5° C.) and below $SiCl_4$ boiling point (57.6° C.). Thus, $BCl_3(g)$, $Cl_2(g)$, $CO_2(g)$, the gaseous product components, remain in gaseous phase in the third pipe system extending between the second and the third condensing units 34, 36.

Third Condensing Unit: $BCl_3$

In the third condensing unit 36, gaseous $BCl_3$ is condensed. The temperature inside the condenser 36 is adjusted to a set-point slightly below the condensation point of $BCl_3$ and the gas entering the condenser 36 is washed with liquid $BCl_3$ 50 allowing its selective condensation. In an embodiment, the temperature inside the condenser 36 ranges between 0 and 10° C. The gaseous product 52 exiting the condenser 36 includes $Cl_2(g)$ and $CO_2(g)$ and it is directed towards a scrubbing and a neutralization systems.

Liquid $BCl_3$ 56 obtained at this condensation step can be recycled as a reagent 223 to the chlorination reactor 14 after a gasification step 58. The quantity of recycled $BCl_3$ 223 used to chlorinate the optical fiber feed 10 and $SiO_2$ rich feed 110 are balanced with additional input of $BCl_3$ 29 or solid boron compound 16, if necessary.

Scrubbing and Neutralization

Chlorine ($Cl_2$) is removed from the gaseous product 52 in a scrubber 54. This scrubbing unit 54 includes a vertical cylinder containing perforated plastic spheres. The scrubber 54 is filled to a certain extend with a solution of NaOH 60. A system, including a pump linked to a recycling loop and a spray nozzle located at the top of the scrubber 54, allows the gaseous product 52 to be washed and contacted with the NaOH solution 60. The following reaction occurs between chlorine contained in the gaseous product 52 and the NaOH solution 60:

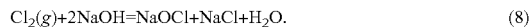
$$Cl_2(g) + 2NaOH = NaOCl + NaCl + H_2O. \quad (8)$$

The pH of the solution is controlled by an exterior supply of concentrated NaOH. The NaOCl solution 62 resulting from the scrubbing procedure is subsequently treated with $H_2O_2$ 64, in an agitated tank 66, in order to obtain a sodium chloride solution 68 by the reaction

$$NaOCl + H_2O_2 = NaCl + H_2O + O_2. \quad (9)$$

The gas exiting at the top of the scrubber contains essentially $CO_2$ 70. If necessary, the $CO_2$ 70 exiting the process can be trapped or neutralized by an existing complementary technology aiming at $CO_2$ emanation recovery.

$Cl_2$ Compressor

In an alternate embodiment, the chlorine scrubber unit 54 can be replaced by a chlorine compressor which allows compression of gaseous chlorine into a liquid chlorine and therefore its separation from gaseous $CO_2$. The compressed chlorine can be stored in gas cylinders for future uses such as one of the chlorination process reactant.

Liquid $GeCl_4$ and Liquid $SiCl_4$

The process described above transforms optical fibers glassy residues or any materials rich in $SiO_2$ in chloride forms which can be directly or indirectly used as feed material for manufacturing optical fibers, various electronic components or solar panels. The liquid tetrachlorides selectively separated during the process and collected at the base of the $GeCl_4$ condenser and the $SiCl_4$ condenser are of relatively high purity.

If necessary, additional purification steps can be performed on the separated tetrachlorides obtained from the process. These additional purification steps can include one or several methods such as distillation, fractional distillation, solvent extraction, resin purification or by a common ion effect.

Figure 6:
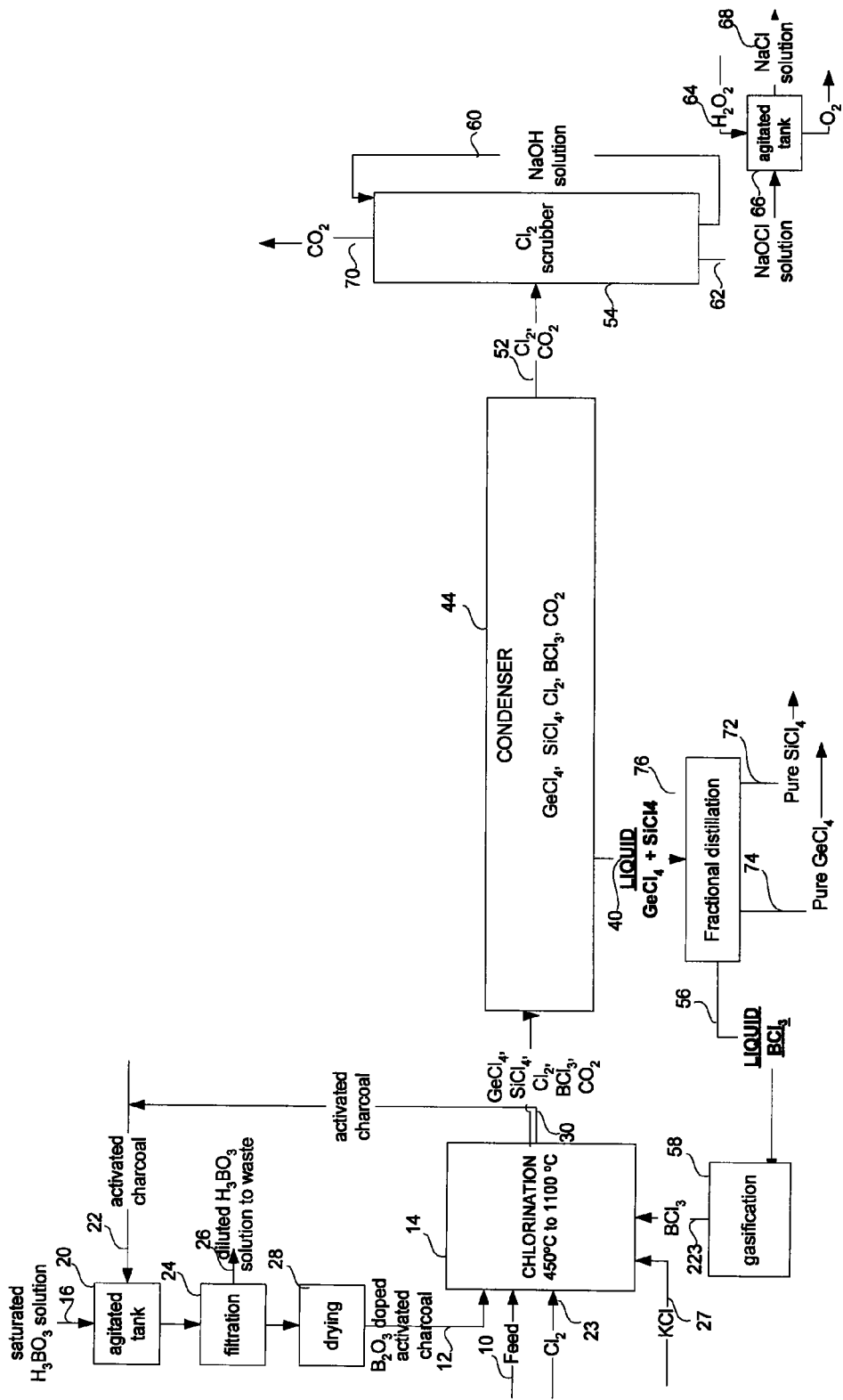
FIG. 6 is a flow diagram of the $SiO_2$ chlorination process in accordance with still another embodiment, with a $SiO_2$ rich feed material.

Alternative Embodiment (FIG. 6)

Alternatively, the gas leaving the reactor 14 and containing $SiCl_4$ and $GeCl_4$ is condensed in a single condenser unit 44. After this condensation step, the components of liquid mixture obtained are separated by fractional distillation 76 providing a means to obtain pure $SiCl_4$ 72 and $GeCl_4$ 74.

Condensing the gaseous phase exiting the reactor into a suitable condenser as a liquid is achieved at a temperature whereas the gas vapor pressure is sufficiently low for obtaining a liquid containing $Cl_2$, $BCl_3$, $SiCl_4$ and $GeCl_4$. The obtained liquid is then transferred to a fractional distillation column.

If necessary, the gaseous phase exiting the condenser is neutralized into a scrubber 54 whereas $Cl_2$ is transformed to NaOCl 62, and residual $BCl_3$, $SiCl_4$ and $GeCl_4$ to their corresponding oxides and/or hydroxides.

The fractional distillation column is operated in such a way that firstly $Cl_2$ is condensed from the top of the column. When $Cl_2$ is completely removed from the mixture, the operational parameters are modified to obtain $BCl_3$ 56 at the top of the column which is also condensed independently. After the complete removal of $BCl_3$ from the mix, the parameters are adjusted to obtain pure $SiCl_4$ 72 at the top of the column which is collected separately. At the end of the distillation step for $SiCl_4$, the bottom flask contains only $GeCl_4$ 74. Such a distillation procedure allows the recovery of four independent liquid compounds $Cl_2$, $BCl_3$, $SiCl_4$ and $GeCl_4$.

Liquid $Cl_2$ can then be recycled as a reacting agent for the process after a suitable gasification step. Liquid $BCl_3$ can also be recycled as a reacting agent for the process after a suitable gasification step.

Figure 7:
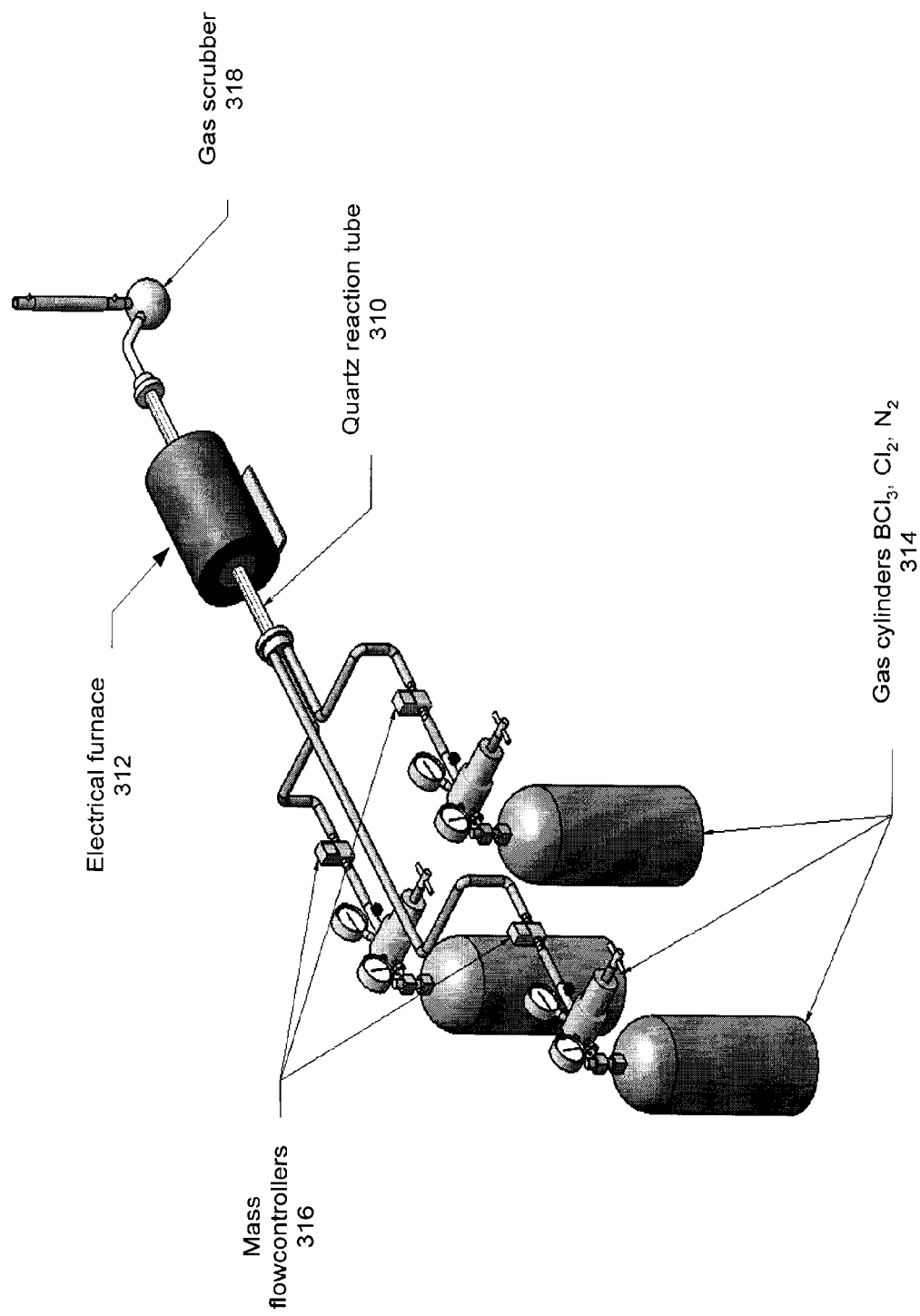
FIG. 7 is a schematic perspective view of an experimental set up in accordance with an embodiment.
Figure 8:
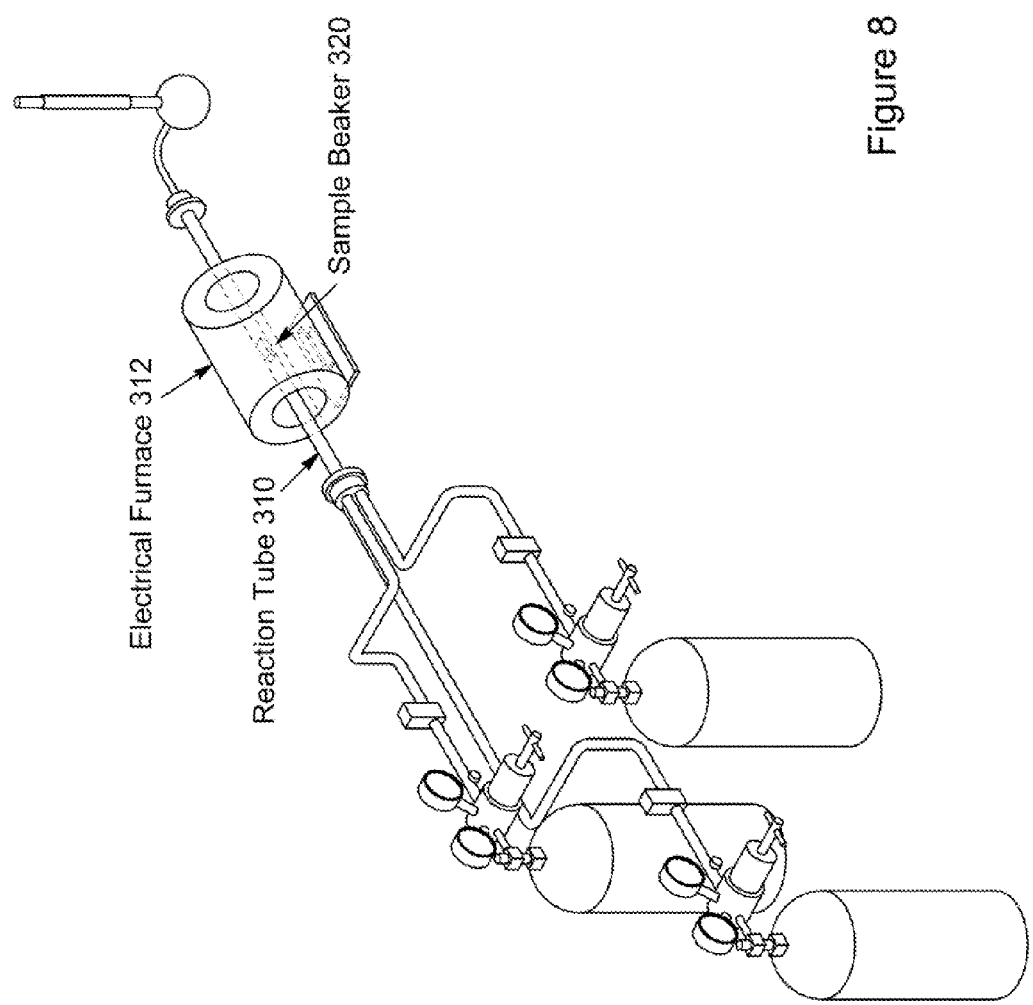
FIG. 8 is a schematic perspective view of the experimental set up shown in FIG. 7, showing the position of a sample beaker.

Experimental Set Up (FIGS. 7 and 8)

Referring to FIGS. 7 and 8, there is shown an experimental set up for carrying out the processes described above. The experiments were performed into a cylindrical horizontal reactor 310 including a quartz tube having an inert lining and heated by an electrical furnace 312, as reaction tube. Cylinders of $Cl_2$, $BCl_3$ and $N_2$ gases 314 were connected to the reaction tube 310. Pressure regulators and mass flow controllers 316 were used to obtain a quantitative distribution of gases into the reaction tube 310 (FIG. 7). Gases leaving the reactor 310 were scrubbed in a scrubber 318 by a NaOH solution, which was periodically changed. $CO_{(g)}$ and $CO_{2(g)}$, were not neutralized by the scrubber 318 and were evacuated by the laboratory fume hood (not shown).

A small number of experiments were conducted using CO as a reducing agent. In these cases, a fourth gas bottle and a corresponding mass flowcontroller were added to the experimental set-up.

In a typical experiment, the following steps were carried out. A given type of an optical preform residue was grinded to minus 20 μm. This grinded material was placed in a beaker 320 (FIG. 8), if necessary, as it will be described in more details below in reference to equations 10 and 11, a solid reducer was added as well as $H_3BO_3$ (directly or adsorbed on the solid reducer). Alternatively, the grinded material was placed in beaker 320, and if necessary, a solid reducer was added with or without KCl, as salt for the reagent mixture.

The beaker 320 was positioned in the center of the reaction tube 310 (FIG. 8). $N_2$ flowed in the system and the solid was dried for a period of one hour at a temperature of 500° C. At the end of the drying step, the furnace temperature was set between 450° C. and 1100° C. When the reaction temperature was reached, the flow of $N_2$ was stopped and $Cl_2$ flowed into the system at a total flowrate varying from 0.1 to 0.4 liter per minute with or without CO or $BCl_3$ as required. When CO was used the flowrate ratio $Cl_2$/CO was set to one for most experiments. When $BCl_3$ was used the flowrate was set to 0.1 liter per minute. After a given period of time, $GeCl_4(g)$ and $SiCl_4(g)$ were produced, exited the furnace 312 and were scrubbed.

The conversion rates of $GeO_2$ and $SiO_2$ for a given experiment were calculated from the mass variations in $GeO_2$ and $SiO_2$ between the masses initially present and those observed at the end of the experiment in the solid residue left in the beaker 320. The mass variations were attributed to the transformations of $GeO_2$ and $SiO_2$ into their respective tetrachlorides ($GeCl_4$ and $SiCl_4$). These tetrachlorides, being volatile in the temperature range investigated, were carried outside the beaker 320 containing the preform sample and were scrubbed by the NaOH solution. The mass variations were calculated from the weight of the sample and the solid residue combined to the respective concentrations of $GeO_2$ and $SiO_2$. The analyses were realized by fusion with lithium metaborate followed by dissolution in $HNO_3$ and HCl, the resulting liquids were analyzed by inductively coupled plasma atomic emission spectroscopy (ICP-AES).

TABLE 1

Experimental parameters and results.

| # Experiment | Beaker type | Time (min) | Stirring | Temperature (° C.) | Mass preform (g) | Boron compound | Quantity Boron compound (g) | Type solid Reducer |
|---|---|---|---|---|---|---|---|---|
| 1 | Fused Quartz | 30 | Ø | 700 | 0.2502 | $H_3BO_3$ | 0.2502 | Ø |
| 2 | Fused Quartz | 60 | Ø | 700 | 0.2502 | No | Ø | Metallurgical Coke |
| 3 | Fused Quartz | 90 | Ø | 700 | 0.2645 | $H_3BO_3$ | 0.2645 | Metallurgical Coke |
| 4 | Fused Quartz | 90 | Ø | 850 | 0.2536 | Non | Ø | Ø |
| 5 | Fused Quartz | 30 | Ø | 850 | 0.2576 | $H_3BO_3$ | 0.2576 | Metallurgical Coke |
| 6 | Fused Quartz | 60 | Ø | 850 | 0.2657 | $H_3BO_3$ | 0.2657 | Metallurgical Coke |
| 7 | Fused Quartz | 60 | Ø | 1000 | 0.2542 | $H_3BO_3$ | 0.2542 | Ø |
| 8 | Fused Quartz | 13 | Ø | 1000 | 0.2534 | $H_3BO_3$ | 0.2533 | Metallurgical Coke |
| 9 | Fused Quartz | 90 | Ø | 1000 | 0.2672 | $H_3BO_3$ | 0.2672 | Metallurgical Coke |
| 10 | Fused Quartz | 30 | Ø | 1000 | 0.2603 | No | Ø | Metallurgical Coke |
| 11 | Graphite | 20 | Ø | 850 | 0.2514 | $B_2O_3$ on activated charcoal | 0.2664 | Activated charcoal |
| 12 | Ceramic | 60 | Ø | 850 | 0.2530 | $B_2O_3$ on activated charcoal | 0.2665 | Activated charcoal |
| 13 | Graphite | 20 + 20 + 20 | 2 | 850 | 0.2512 | $B_2O_3$ on activated charcoal | 0.2664 | Activated charcoal |

| # Experiment | Mass solid reducer (g) | Gaseous reducer | Flowrate gaseous Reducer (L/min) | Flowrate $Cl_2$ (L/min) | Conversion rate $SiO_2$ (%) | Conversion rate $GeO_2$ (%) |
|---|---|---|---|---|---|---|
| 1 | Ø | CO | 0.4 | 0.4 | 24 | |
| 2 | 0.5004 | Ø | Ø | 0.4 | 3 | |
| 3 | 0.5290 | CO | 0.4 | 0.4 | 24 | |
| 4 | Ø | CO | 0.4 | 0.4 | 1 | |
| 5 | 0.5152 | Ø | Ø | 0.4 | 29 | |
| 6 | 0.5314 | CO | 0.4 | 0.4 | 25 | |
| 7 | Ø | CO | 0.4 | 0.4 | 7 | |
| 8 | 0.5064 | Ø | Ø | 0.4 | 30 | |
| 9 | 0.5343 | Ø | Ø | 0.4 | 30 | |
| 10 | 0.5207 | CO | 0.4 | 0.4 | 6 | |
| 11 | 1.7360 | Ø | Ø | 0.4 | 67 | 79 |
| 12 | 1.7361 | Ø | Ø | 0.4 | 65 | 76 |
| 13 | 1.7355 | Ø | Ø | 0.4 | 72 | 84 |

TABLE 2

Experimental parameters and results.

| Sample number | Time (min) | Partial mixing | Temperature (° C.) | Sample type | Mass $SiO_2$ (g) | Type of Boron addition | Mass of Boron addition (g) or L/min | KCl %$^{-1}$ | Type of reducing agent | Mass of Reducing agent (g) |
|---|---|---|---|---|---|---|---|---|---|---|
| 1 | 30 | Ø | 850 | Preform | 0.2503 | $BCl_3$ | 0.1 L/min | 23 | Darco 20X40 | 0.8642 |
| 2 | 30 | Ø | 850 | Preform | 0.5000 | $BCl_3$ | 0.1 L/min | 13 | Darco 20X40 | 0.9000 |
| 3 | 30 | Ø | 850 | Preform | 0.2501 | $BCl_3$ | 0.1 L/min | 23 | Darco 20X40 | 0.8643 |
| 4 | 30 | Ø | 850 | Preform | 0.9006 | $BCl_3$ | 0.1 L/min | 13 | Darco 20X40 | 0.9002 |
| 5 | 30 | Ø | 850 | Preform | 0.2502 | $BCl_3$ | 0.1 L/min | 14 | Darco 20X40 | 1.7288 |
| 6 | 60 | Ø | 850 | Preform | 0.2502 | $BCl_3$ | 0.1 L/min | 14 | Darco 20X40 | 1.7285 |
| 7 | 30 | Ø | 850 | Preform | 0.9006 | $BCl_3$ | 0.1 L/min | 13 | Darco 20X40 | 0.4506 |
| 8 | 30 | Ø | 850 | Preform | 0.2504 | $BCl_3$ | 0.1 L/min | 12 | Darco 20X40 | 1.7285 |
| 9 | 30 | Ø | 850 | Preform | 0.2501 | $BCl_3$ | 0.1 L/min | 7 | Darco 20X40 | 1.7285 |
| 10 | 30 | Ø | 700 | Preform | 0.2505 | $BCl_3$ | 0.1 L/min | 14 | Darco 20X40 | 1.7288 |
| 11 | 30 | Ø | 850 | Preform | 0.2505 | $BCl_3$ | 0.1 L/min | 4 | Darco 20X40 | 1.7377 |
| 12 | 30 | Ø | 850 | Preform | 0.2501 | $BCl_3$ | 0.1 L/min | Ø | Darco 20X40 | 1.7289 |
| 13 | 30 | Ø | 850 | Preform | 0.2501 | $BCl_3$ | 0.1 L/min | Ø | Ø | 0.0000 |
| 14 | 30 | Ø | 850 | Preform | 0.2500 | $B_2O_3$ AC | 0.5000 | 12 | Darco 20X40 | 1.7285 |
| 15 | 30 | Ø | 850 | Preform | 0.2505 | $B_2O_3$ AC | 0.4998 | Ø | Darco 20X40 | 1.7281 |
| 16 | 30 | Ø | 1000 | Preform | 0.2603 | Ø | Ø | Ø | Metallurgical Coke | 0.5207 |
| 17 | 60 | Ø | 700 | Preform | 0.2502 | Ø | Ø | Ø | Metallurgical Coke | 0.5004 |
| 18 | 90 | Ø | 850 | Preform | 0.2536 | Ø | Ø | Ø | Ø | Ø |

TABLE 2-continued

Experimental parameters and results.

| Sample number | Addition of CO | CO Flow (L/min) | $Cl_2$ Flow (L/min) | Sample weight before reaction (g) | sample weight after reaction (g) | Weight loss (%) | Conversion rate $SiO_2$ (%) | Conversion rate $GeO_2$ (%) |
|---|---|---|---|---|---|---|---|---|
| 1 | Ø | Ø | 0.4 | 1.4489 | 0.7637 | 47.29 | 98 | 96 |
| 2 | Ø | Ø | 0.4 | 1.6105 | 0.5589 | 65.30 | 98 | 99 |
| 3 | Ø | Ø | 0.4 | 1.4491 | 0.6818 | 52.95 | 98 | 97 |
| 4 | Ø | Ø | 0.4 | 2.0711 | 0.4779 | 76.93 | 97 | 99 |
| 5 | Ø | Ø | 0.4 | 2.3135 | 1.5271 | 33.99 | 96 | 96 |
| 6 | Ø | Ø | 0.4 | 2.3133 | 1.4153 | 38.82 | 95 | 97 |
| 7 | Ø | Ø | 0.4 | 1.5537 | 0.1424 | 90.83 | 94 | 95 |
| 8 | Ø | Ø | 0.4 | 2.2491 | 1.6148 | 28.20 | 88 | 96 |
| 9 | Ø | Ø | 0.4 | 2.1171 | 1.5011 | 29.10 | 85 | 95 |
| 10 | Ø | Ø | 0.4 | 2.3138 | 1.9136 | 17.30 | 72 | 72 |
| 11 | Ø | Ø | 0.4 | 2.067 | 1.6094 | 22.14 | 71 | 78 |
| 12 | Ø | Ø | 0.4 | 1.979 | 1.6235 | 17.96 | 61 | 68 |
| 13 | CO | 0.4 | 0.4 | 0.2501 | 0.1370 | 45.22 | 51 | 49 |
| 14 | Ø | Ø | 0.4 | 2.8128 | 1.4274 | 49.25 | 79 | 78 |
| 15 | Ø | Ø | 0.4 | 2.4784 | 1.448 | 41.58 | 60 | 64 |
| 16 | CO | 0.4 | 0.4 | 0.781 | 0.7107 | 9.00 | 6 | NA |
| 17 | Ø | Ø | 0.4 | 0.7507 | 0.7143 | 4.85 | 3 | NA |
| 18 | CO | 0.4 | 0.4 | 0.2536 | 0.2487 | 1.93 | 1 | NA |

[1] (mass of KCl/total mass of the sample) × 100
NA: not analyzed
$B_2O_3$ AC: $B_2O_3$ adsorbed on activated charcoal

EXAMPLES

For all experiments, the experimental parameters used and the conversion rates obtained are reported in Tables 1 and 2. The experiments of Tables 1 and 2 were conducted with an optical fiber preform containing 99 wt % $SiO_2$ and 1 wt % $GeO_2$. The specific examples described below contain additional experimental details.

To evaluate the effect of the reducer nature, another chlorination process, referred here as the high temperature process, was carried out. This high temperature process uses chlorine gas or HCl gas in combination with a CO gas reducing agent to transform oxides phases in chlorides and, more particularly, to transform the components of optical fibers in their chloride precursors, $GeCl_4$ and $SiCl_4$. The reactions occurring at the carbochlorination step being:

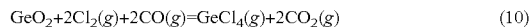
$$GeO_2 + 2Cl_2(g) + 2CO(g) = GeCl_4(g) + 2CO_2(g) \quad (10)$$

and

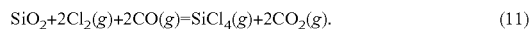
$$SiO_2 + 2Cl_2(g) + 2CO(g) = SiCl_4(g) + 2CO_2(g). \quad (11)$$

The experiments were conducted at 1200° C. showed that less than 5% of $SiO_2$, one of the two main chemical targets, was converted to a chloride form. Thus, this high temperature process was considered relatively non efficient.

Example 1

Identification of the Main Parameters Influencing the Simultaneous Conversion of $GeO_2$ and $SiO_2$ into $GeCl_4$ and $SiCl_4$ In order to minimize the number of experiments to identify the main parameters controlling the conversion of $GeO_2$ and $SiO_2$ into $GeCl_4$ and $SiCl_4$ an orthogonal matrix of the Taguchi type was constructed using four parameters: a) reaction time, b) reaction temperature, c) addition of boron, d) type of reducer. The reaction time was varied from 20 to 90 minutes. The temperature was varied from 700° C. to 1200° C. The solid reducers tested were metallurgical coke and gaseous CO. Boron was added directly as $H_3BO_3$. The parameters tested and the conversion rates obtained, according to the pre-defined orthogonal matrix, are reported at Table 1 under experiments No. 1-10. For these experiments only the conversion factor for $SiO_2$ was considered has being of significance for the variance analysis since the analytical errors on $GeO_2$ conversion rates were superior to those for $SiO_2$ and were introducing additional errors for the determination of the influent parameters. High conversion rates for $SiO_2$ tend to favor higher conversion rates for $GeO_2$ because of the physical nature of $GeO_2$—$SiO_2$ glasses. More particularly, the main component, $SiO_2$, is effectively removed as a gas and therefore it exposes $GeO_2$ to the chemical reactants present in the reactor. The conversion rates for $SiO_2$ varied from 1 to 30% depending on the experimental conditions. The variance analysis for the parameters tested was calculated using the Optimum software distributed by TDC software.

Three important observations resulted from the analysis carried. First, the addition of boron as $H_3BO_3$ was always linked to the highest $SiO_2$ conversion rates. This parameter alone accounted for 66% of the variance between all results. This observation is consistent with experimental data available from the scientific literature, as described above in the chlorination section. Second, metallurgical coke as a reducer was more efficient than CO alone or combined with metallurgical coke. Third, the reaction time within the selected matrix range, i.e. from 30 to 90 minutes, appeared to have little influence on the $SiO_2$ conversion rates.

The second and the third observations are related. Solid carbonaceous reducing agents, such as metallurgical coke, tend to accelerate chlorination reactions. This is attributed to the formation of atomic chlorine or activated chlorine species at their surfaces followed by desorption. These species then react with the surface of the compound targeted for chlorination (Korshunov, 1992, Metallurgical Review of MMIJ, 8, (2), pp. 1-33). The distance between a given carbonaceous solid reducer and an oxide surface is important. If this distance increases to a certain level, the atomic chlorine or activated chlorine liberated in the gas phase can recombine, as the result of particle collisions, and become deactivated. During the chlorination reactions, the carbonaceous reducer surfaces in contact or near the oxides are consumed and therefore the distances separating the solid reducers and the oxides are constantly increasing and eventually reach a point where the concentrations of atomic chlorine or activated chlorine species are low due to recombination reactions. The reaction speeds are then lowered and proceed via a mechanism involving molecular chlorine (Barin and Schuler, 1980, Metallurgical Transactions B, 11B, pp. 199-207). For a given chlorination reaction conducted in a static reactor involving carbon as a solid reducer, two kinetic zones are thus recognizable. An initially rapid one characterized by fast reaction kinetics driven by atomic chlorine or activated chlorine species. A later slow one characterized by slow reaction kinetics conducted via molecular chlorine. It is probable that the selected reaction times where such that the chlorination reactions had already reached the slow kinetic zone showing only minor gains in the conversion rate of $SiO_2$ with time.

These observations were used to design experiments in order to increase the conversion rates of $GeO_2$ and $SiO_2$. Equations 5 to 7 shows that only equation 7 requires the use of chlorine in the presence of a carbonaceous solid reducer. Once that $BCl_3$ is formed it is assumed that the reactions with $GeO_2$ and $SiO_2$ will occur rapidly and will not proceed through a diffusion mechanism implying atomic chlorine or activated chlorine species. $BCl_3$ is a very strong Lewis acid (Alam et al., 2004) and should react very rapidly with the two free electron pairs on each oxygen atom of $GeO_2$ and $SiO_2$. Kinetic optimization of reaction 9, assuming $BCl_3$ formation is the slow step, should increase the entire kinetic of the chemical system. The next example illustrates the effects of the optimization of $BCl_3$ formation on the conversion rates of $GeO_2$ and $SiO_2$.

Example 2

Optimization of $BCl_3$ Formation and its Effects on the Conversion Rates of $GeO_2$ and $SiO_2$ In order to maximize contact between a given boron compound and the carbonaceous solid reducer, a solution saturated with boric acid was placed in a beaker with activated charcoal. The pulp was then agitated and filtered. The solid residue obtained was dried over night in an oven at 150° C. The resulting activated charcoal doped with boron was used for the experiments.

It is known that $BCl_3$ react vigorously with water, in fact with any compounds containing oxygen as explained above. To minimize side reactions of $BCl_3$ with water an addition to the experimental procedure already described was effected. The reagent, placed in the furnace, was dried at 500° C. for 3 hours under a nitrogen atmosphere before being exposed to the chlorine gas. The experimental parameters and the results for these experiments are reported in Table 1 under experiments No. 11 and 12. For these two experiments, the conversion rates for $GeO_2$ are high, 79% and 76% respectively for experiments 11 and 12. Similarly the conversion rates for $SiO_2$ are also high, 67% and 65% respectively for experiments 11 and 12. As expected, there is a direct relationship between $GeO_2$ and $SiO_2$ conversion rates. Comparatively to experiment 11, the reaction time was increased from 20 to 60 minutes in experiment 12. No important conversion rate improvement was observed; the conversion rates obtained for experiment 12 were within analytical errors of those of experiment 11.

Example 3

Effect of a <<Simulated Partial Mixing>> on the Conversion Rates of $GeO_2$ and $SiO_2$ Experiments 1 to 12 were carried inside a static horizontal reactor. It was not possible to revise FIG. 7 experimental set up into a dynamic arrangement without introducing major modifications to the system. However, in experiment 13, the experimental procedure was adapted in order to simulate one or several partial mixing episodes.

After a given reaction time, the chlorine flow was turned off and $N_2$ was flowed into the quartz reaction tube. The furnace temperature was lowered from the predetermined experimental temperature to 350° C. The beaker containing the powder was withdrawn from the furnace still hot using a glass rod. The powder was then mixed with a glass spoon for few minutes under a fume hood. The beaker containing the powder was then replaced in the furnace, the temperature was adjusted to the predetermined experimental temperature and a current of $N_2$ was maintained into the reaction tube. When the predetermined experimental temperature was reached, $N_2$ was turned off and $Cl_2$ flowed in the system.

Experiment 13 of Table 1 presents the experimental parameters and the conversion rates obtained. In this specific experiment, two partial mixing episodes were realized, each after a 20 minutes period of reaction time. The total reaction time under chlorine atmosphere was 60 minutes. The conversion rates obtained for $GeO_2$ and $SiO_2$ were respectively 84% and 72%. Those results are directly comparable to experiment 12 for which all experimental parameters are equivalent to experiment 13 except that no partial mixing was involved. This comparison indicates that the simulated partial mixing resulted into an 8% increase in the conversion rate of $GeO_2$, from 76 to 84%, and into a 7% increase in the conversion rate for $SiO_2$, from 65 to 72%. Clearly mixing has a positive impact on the conversion rates.

As previously discussed in Example 1, any chemical methods, such as adsorption, or physical methods, such as mixing, increasing contacts between oxides particles and carbonaceous solid reducer particles appear to enhance the global efficiency of the chlorination procedure.

The technology describes above allows the production of high purity chlorides from glassy residues originating from optical fibers manufacturing or isolated from wasted optical cables.

It allows to produce directly $GeCl_4$ and $SiCl_4$ from the customary components of optical fibers glassy residues, $GeO_2$ and $SiO_2$, without the formation of intermediate components such as silicon and elemental germanium. Also, $GeCl_4$ and $SiCl_4$ obtained are isolated from one another and can be used as primary reactants in the dechlorination reactions for such processes as MCVD, ODS, AVD and other related methods.

$GeO_2$ and $SiO_2$, contained in glassy residues of optical fibers, are concurrently extracted from glassy residues of optical fibers as $GeCl_4$ and $SiCl_4$ respectively. Moreover, they are extracted as gaseous $GeCl_4$ and $SiCl_4$ which leave the reaction reactor as gases.

The gaseous $GeCl_4$ and $SiCl_4$ leaving the reactor are condensed separately, as liquids, in the appropriate condensers placed at the exit of the chlorination reactor. The first condenser extracts and condenses mainly $GeCl_4$ whereas the second condenser extracts and condenses mainly $SiCl_4$.

$GeCl_4$ and $SiCl_4$ obtained can be directly used as high purity chemicals for the production of optical fibers or others processes requiring high purity chemicals. Alternatively, GeCl$_4$ and SiCl$_4$ obtained can be submitted to an already existing purification procedure, such as fractional distillation, in order to reach the purity level needed.

Procedures are also available for the neutralization and/or the recycling of the chemicals needed in the process.

Example 4

BCl$_4^-$ as Chlorination Agent

Although chlorination reactions can be conducted in numerous ways, it is recognized that carbonaceous solid reducing agents such as metallurgical coke and activated charcoal tend to accelerate chlorination reactions. This is attributed to the formation of atomic chlorine, activated chlorine species or ionic chlorine (Cl$^-$ and/or Cl$^+$) at their surfaces followed by desorption. These species, herein referred to as active chlorine, then react with the surface of the compound targeted for chlorination (Korshunov, 1992, Metallurgical Review of MMIJ, 8, (2), pp. 1-33).

The distance between a given carbonaceous solid reducer and an oxide surface is also relatively important. If this distance increases above a certain threshold, the active chlorine liberated in the gas phase can recombine and deactivate. During chlorination reactions, the carbonaceous reducer surfaces in contact or near the oxides are consumed and therefore the distance separating the solid reducer and the oxides is constantly increasing during the chlorination reaction process and eventually reaches a point where the active chlorine concentrations are low due to recombination reactions. The reaction speed thus slows down and the reaction proceeds via a mechanism involving molecular chlorine (Barin and Schuler, 1980, Metallurgical Transactions B, 11B, pp. 199-207).

Thus for chlorination reactions, a rapid kinetic is first associated to the formation of active chlorine and second to the stability over time of active chlorine. The experiment designs were based on these two observations to obtain high conversion rates for SiO$_2$ and GeO$_2$.

The action of BCl$_3$ on SiO$_2$ to produce SiCl$_4$ and B$_2$O$_3$ was recognized at a temperature around 350° C. (See for instance Kroll, Metal Industry, 1952, 81, (13), 243-6; Savel'ev et al., Neorganicheskie Materialy, 1973, 9, (2), 325-6). B$_2$O$_3$ can be chlorinated (or regenerated) as BCl$_3$ by the action of Cl$_2$ and a reducing agent such as coke or activated charcoal (Alam et al., 2004, Kirk-Othmer Encyclopedia of chemical technology, 138-168). U.S. Pat. No. 4,490,344 discloses a combination of BCl$_3$, Cl$_2$ and coke to produce SiCl$_4$ from SiO$_2$ in accordance with the following reactions:

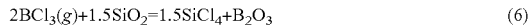
$$2BCl_3(g)+1.5SiO_2=1.5SiCl_4+B_2O_3 \quad (6)$$

$$B_2O_3+1.5C+3Cl_2=2BCl_3(g)+1.5CO_2 \quad (7)$$

These reactions are not carried out with active chlorine such as ionic chlorine (Cl$^-$ and or Cl$^+$). Moreover, the stability of active chlorine is not considered in reaction 6 and 7.

In order to produce active chlorine and ion BCl$_4^-$, BCl$_3$ was reacted with KCl to produce the molten salt KBCl$_4$. The following chemical system was used to chlorinate SiO$_2$ and GeO$_2$:

$$KCl+BCl_3(g)=K^++BCl_4^-(l) \quad (10)$$

$$4BCl_4^-(l)+GeO_2+C=GeCl_4(g)+4BCl_3(g)+CO_2(g) \quad (11)$$

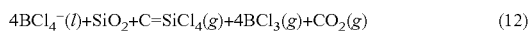
$$4BCl_4^-(l)+SiO_2+C=SiCl_4(g)+4BCl_3(g)+CO_2(g) \quad (12)$$

$$BCl_3(g)+Cl_2(g)=BCl_4^-+Cl^+ \quad (13)$$

$$K^++BCl_4^-=KBCl_4 \quad (14)$$

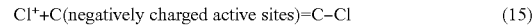
$$Cl^++C(\text{negatively charged active sites})=C-Cl \quad (15)$$

To evaluate the chlorination reaction efficiency using BCl$_4^-$, a series of experiments was carried out. The results are reported in Table 2 with sample numbers 1 to 11. The highest conversion rates were obtained for samples 1 to 7. More particularly, the conversion rates for both SiO$_2$ and GeO$_2$ in respectively SiCl$_4$ and GeCl$_4$ were equal to or higher than 94 wt %. The reaction temperature was maintained at 850° C. and the KCl content in the reagent mixture was varied from 13 to 23 wt %. The reaction duration was varied between 30 to 60 minutes and the ratio (oxide mass)/(activated charcoal mass) was varied between 0.14 to 1. For sample number 7, the ratio (oxide mass)/(activated charcoal mass) was adjusted to 2. For this specific sample, the conversion rates for SiO$_2$ and GeO$_2$ were respectively 94 wt % and 95 wt %.

Results from samples 8, 9, and 11 indicated that a decrease in the KCl addition resulted in lower conversion rates for SiO$_2$ and GeO$_2$. Higher SiO$_2$ and GeO$_2$ conversion rates were obtained for KCl addition ranging between 12 and 15 wt % and, in an embodiment, proximate to 13 wt %.

In sample 10, lowering the reaction temperature from 850° C. to 700° C. reduced the conversion rates to 72 wt % for both SiO$_2$ and GeO$_2$.

One experiment was stopped after 10 minutes and the SiO$_2$—GeO$_2$ glasses were analyzed with a microprobe in order to search for the presence of B$_2$O$_3$. B$_2$O$_3$ was not detected in the analyzed sample. This was interpreted has an indication that the chlorination reactions were occurring in accordance with reactions 10 to 15 without the intermediate formation of B$_2$O$_3$.

These results show that the chlorination of SiO$_2$ and GeO$_2$ is efficiently conducted with a reagent mixture including BCl$_3$, KCl, Cl$_2$ and activated charcoal, a chemical system promoting the formation of BCl$_4^-$ as chlorination agent. Conversion rates equal to or higher than 94 wt % for both SiO$_2$ and GeO$_2$ into their tetrachlorides SiCl$_4$ and GeCl$_4$ were obtained at temperatures around 850° C. and for a reaction time of approximately 30 minutes.

Example 5

BCl$_3$ as Chlorination Agent

To demonstrate that the chemical system using BCl$_4^-$ described in the previous example is more efficient than one using BCl$_3$ as the chlorination agent (for example U.S. Pat. No. 4,490,344), experiments using a reagent mixture including BCl$_3$ but substantially free of KCl were conducted. Results are presented in Table 2 with sample numbers 12 and 13.

Sample 12 was chlorinated under experimental conditions identical to sample 5 with exception that KCl was not added to the reagent mixture. For sample 12, the conversion rates for SiO$_2$ and GeO$_2$ were respectively 61 wt % and 68 wt %. For sample 5 having a reagent mixture including 14 wt % KCl, the conversion rates were 96 wt % for both SiO$_2$ and GeO$_2$.

These data clearly show the effect of the KCl addition in the reagent mixture. Addition of KCl in the reagent mixture leads to a 57% increase in the SiO$_2$ conversion rate and a 41% increase in the GeO$_2$ conversion rate. For sample number 13, the activated carbon in the reagent mixture was replaced by CO. As for sample 12, the reagent mixture was substantially free of KCl. The conversion rates obtained were 51 wt % for SiO$_2$ and 49 wt % for GeO$_2$. Higher conversion rates for both SiO$_2$ and GeO$_2$ were obtained with activated carbon as solid reducer in the reagent mixture rather than CO.

Example 6

Chlorination with B$_2$O$_3$ as a Starting Chemical Component

BCl$_3$ can be produced by chlorination from B$_2$O$_3$ (Alam et al., 2004). In certain circumstances, it could be advantageous to prepare BCl$_3$ from B$_2$O$_3$ by chlorination, the produced BCl$_3$ being used as chlorination agent. Experiments were conducted to investigate the effect of KCl addition in such cases.

As shown in FIG. 3 to prepare the solid reducer, a solution saturated with boric acid was placed in a beaker with activated charcoal. The pulp was then agitated and filtered. The solid residue obtained was dried over night in an oven at 150° C. The resulting activated charcoal doped with boron was used for the chlorination experiments. It is known that BCl$_3$ react vigorously with water. To minimize side reactions of BCl$_3$ with water, an additional step was carried out in the experimental procedure. More particularly, the charge was dried in the furnace at 500° C. for 3 hours under a nitrogen atmosphere before being exposed to the reagent mixture including gaseous chlorine.

The experimental parameters and results for these experiments are reported in Table 2 with sample numbers 14 and 15. For sample 14 wherein the reagent mixture includes 13 wt % KCl, the conversion rates obtained for SiO$_2$ and GeO$_2$ were respectively 79 wt % and 78 wt %. With a reagent mixture substantially free of KCl and for the same experimental conditions, the conversion rates dropped to 60 wt % for SiO$_2$ and to 64 wt % for GeO$_2$ in sample 15. Adding KCl in the reagent mixture lead to an increase in the SiO$_2$ and GeO$_2$ conversion rates.

Example 7

Effect of Using Only Cl$_2$ and a Reducer

Experiments were also conducted using Cl$_2$ as the only chlorination agent in the presence of a reducer. Reducers tested were gaseous CO and metallurgical coke. When CO is used, the reactions occurring in the carbochlorination step are:

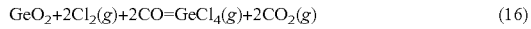
$$GeO_2+2Cl_2(g)+2CO=GeCl_4(g)+2CO_2(g) \quad (16)$$

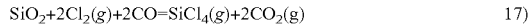
$$SiO_2+2Cl_2(g)+2CO=SiCl_4(g)+2CO_2(g) \quad (17)$$

When CO is replaced by metallurgical coke, the reactions are:

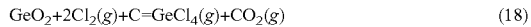
$$GeO_2+2Cl_2(g)+C=GeCl_4(g)+CO_2(g) \quad (18)$$

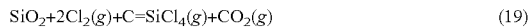
$$SiO_2+2Cl_2(g)+C=SiCl_4(g)+CO_2(g) \quad (19)$$

Results reported in Table 2 under sample numbers 16 to 18 indicated that the conversion rates for SiO$_2$ are smaller than or equal to 6 wt %. It is probable that the experimental conditions for samples 16 to 18 do not facilitate the formation of a high active chlorine concentration. Therefore the efficiency of the chlorination is reduced when compare to experimental conditions using a reagent mixture including KCl and BCl$_3$ for similar reaction temperatures (850° C. and 1000° C.) and reaction time.

The technology described above allows the production of high purity tetrachlorides from glassy residues originating from optical fibers manufacturing or isolated from wasted optical cables. The technology also describes a method for the production of SiCl$_4$ from material rich in SiO$_2$ and substantially free of GeO$_2$.

It allows to produce directly and concurrently GeCl$_4$ and SiCl$_4$ from the customary components of optical fibers glassy residues, GeO$_2$ and SiO$_2$, without the formation of intermediate components such as silicon and elemental germanium. Also, GeCl$_4$ and SiCl$_4$ obtained are isolated from one another and can be used as primary reactants in the dechlorination reactions for such processes as MCVD, ODS, AVD and other related methods since they are identical to those commonly employed in the fabrication of optical fibers.

GeO$_2$ and SiO$_2$, contained in glassy residues of optical fibers, are concurrently extracted from glassy residues of optical fibers as GeCl$_4$ and SiCl$_4$ respectively. Moreover, they are extracted as gaseous GeCl$_4$ and SiCl$_4$ which leave the reaction reactor as gases.

In an alternate embodiment, SiO$_2$ contained in a SiO$_2$-rich material rich can be transformed mainly in gaseous SiCl$_4$ which is subsequently condensed at the exit of the chlorination reactor.

The gaseous GeCl$_4$ and SiCl$_4$ leaving the reactor are condensed separately, as liquids, in the appropriate condensers placed at the exit of the chlorination reactor. The first condenser extracts and condenses mainly GeCl$_4$ whereas the second condenser extracts and condenses mainly SiCl$_4$.

GeCl$_4$ and SiCl$_4$ obtained can be directly used as high purity chemicals for the production of optical fibers or others processes requiring high purity chemicals. Alternatively, GeCl$_4$ and SiCl$_4$ obtained can be submitted to an already existing purification procedure, such as fractional distillation, in order to reach the purity level needed.

Procedures are also available for the neutralization and/or the recycling of the chemicals needed in the process.

The embodiments of the invention described above are intended to be exemplary only. For example, it is appreciated that any means for routing, transporting and transferring, solid, gas, liquid and pulp between the various process units can be used. The scope of the invention is therefore intended to be limited solely by the scope of the appended claims.

The invention claimed is:

1. A method for producing GeCl$_4$ and SiCl$_4$ from optical fibers, the method comprising the steps of:
    adsorbing, in an agitated tank, a boron compound on a solid carbonaceous reducing agent, from a solution including the boron compound, to obtain a solid carbonaceous reducing agent doped with the adsorbed boron compound;
    separating by filtration the solid carbonaceous reducing agent doped with the adsorbed boron compound from the solution;
    drying the solid carbonaceous reducing agent doped with the adsorbed boron compound;
    reacting comminuted optical fibers including germanium and silicon oxides with a reagent including the dried solid carbonaceous reducing agent doped with the adsorbed boron compound and chlorine to obtain a gaseous product including gaseous GeCl$_4$, gaseous SiCl$_4$ and gaseous BCl$_3$;
    firstly condensing the gaseous GeCl$_4$ into liquid GeCl$_4$ by lowering gaseous product temperature below GeCl$_4$ condensing temperature and above SiCl$_4$ condensing temperature; and
    secondly condensing the gaseous SiCl$_4$ into liquid SiCl$_4$ by lowering gaseous product temperature below SiCl$_4$ condensing temperature and above BCl$_3$ condensing temperature
    wherein the boron compound is H$_3$BO$_3$.

2. The method as claimed in claim 1, wherein the solution is saturated with the boron compound.

3. The method as claimed in claim 1, wherein the drying step is carried out at a temperature ranging between 450 and 550° C.

4. The method as claimed in claim 1, wherein the solid carbonaceous reducing agent is one of metallurgical coke and activated carbon.

5. A method for producing $SiCl_4$ from $SiO_2$-containing material, the method comprising the steps of:
reacting comminuted $SiO_2$-containing material with a reagent including a solid carbonaceous reducing agent, a salt selected from the group consisting of: KCl, CsCl and RbCl, and a boron compound to obtain a gaseous product including gaseous $SiCl_4$ in accordance with the following reactions:

$$XCl+BCl_3(g)=X^++BCl_4^-(l), \text{ where X is at least one of K, Cs, and Rb corresponding to the salt}$$

$$4BCl_4^-(l)+SiO_2+C=SiCl_4(g)+4BCl_3(g)+CO_2$$

$$BCl_3(g)+Cl_2(g)=BCl_4^-+Cl^+$$

condensing the gaseous $SiCl_4$ into liquid $SiCl_4$ by lowering gaseous product temperature below $SiCl_4$ condensing temperature.

6. The method according to claim 5, wherein the $SiO_2$-containing material is glassy residues.

7. The method according to claim 5, wherein the $SiO_2$-containing material further contains $GeO_2$ and the reaction also produces $GeCl_4$ according to the reaction:

$$4BCl_4^-(l)+GeO_2+C=GeCl_4(g)+4BCl_3(g)+CO_2$$

further comprising condensing the gaseous $SiCl_4$ and $GeCl_4$ into liquid $SiCl_4$ and $GeCl_4$ by lowering gaseous product temperature below $SiCl_4$ and $GeCl_4$ condensing temperatures.

8. The method according to claim 5, wherein $BCl_2$ is condensed along with condensing $SiCl_4$ by lowering gaseous product temperature below $SiCl_4$ and $BCl_3$ condensing temperatures.

9. A method for producing $SiCl_4$ and $GeCl_4$ from optical fiber glassy residues, the method comprising the steps of:
reacting comminuted optical fiber glassy residues with a reagent including a solid carbonaceous reducing agent, a salt selected from the group consisting of KCl, RbCl, and CsCl, chlorine and a boron compound to obtain a gaseous product including gaseous $GeCl_4$ and gaseous $SiCl_4$ in accordance with the following reactions:

$$XCl+BCl_3(g)=X^++BCl_4^-(l), \text{ where X is at least one of K, Cs, and Rb corresponding to the salt}$$

$$4BCl_4^-(l)+GeO_2+C=GeCl_4(g)+4BCl_3(g)+CO_2$$

$$4BCl_4^-(l)+SiO_2+C=SiCl_4(g)+4BCl_3(g)+CO_2$$

firstly condensing the gaseous $GeCl_4$ into liquid $GeCl_4$ by lowering gaseous product temperature below $GeCl_4$ condensing temperature and above $SiCl_4$ condensing temperature; and
secondly condensing the gaseous $SiCl_4$ into liquid $SiCl_4$ by lowering gaseous product temperature below $SiCl_4$ condensing temperature and above $BCl_3$ condensing temperature.

10. The method as claimed in claim 6, wherein the ratio of solid carbonaceous reducing agent mass and glassy residue mass ranges between 0.3 and 1.

11. The method as claimed in claim 6, wherein the ratio of salt mass and the sum of glassy residue mass, solid carbonaceous reducing agent mass, and salt mass ranges between 0.03 and 0.15.

12. The method as claimed in claim 6, further comprising drying the comminuted glassy residues at a temperature ranging between 400 and 600° C. prior to carrying the reacting step.

13. The method as claimed in claim 5, wherein the solid carbonaceous reducing agent is one of metallurgical coke, graphite and activated carbon.

14. The method as claimed in claim 5, wherein the boron compound comprises gaseous $BCl_3$.

15. A method for producing $SiCl_4$ from glassy residues containing silicon oxide, the method comprising the steps of:
reacting the glassy residues with a reagent including a solid carbonaceous reducing agent, a salt selected from the group consisting of KCl, RbCl, and CsCl, chlorine and a boron compound to obtain a gaseous product including gaseous $SiCl_4$; and
condensing the gaseous $SiCl_4$ into liquid $SiCl_4$ by lowering the gaseous product temperature below $SiCl_4$ condensing temperature.

16. The method according to claim 5, wherein the salt is KCl.

17. The method according to claim 15, wherein the glassy residues comprise glassy residues of optical fibers.

* * * * *